US010458179B2

(12) United States Patent
Hall et al.

(10) Patent No.: US 10,458,179 B2
(45) Date of Patent: Oct. 29, 2019

(54) SOLAR-POWERED WINDOW COVERING

(71) Applicants: David R. Hall, Provo, UT (US); Austin Carlson, Provo, UT (US); Jerome Miles, Spanish Fork, UT (US); Kevin Rees, Herriman, UT (US); Emily Brimhall, Alpine, UT (US); Joe Fox, Spanish Fork, UT (US); Jedediah Knight, Provo, UT (US); Joseph Duncan, Provo, UT (US)

(72) Inventors: David R. Hall, Provo, UT (US); Austin Carlson, Provo, UT (US); Jerome Miles, Spanish Fork, UT (US); Kevin Rees, Herriman, UT (US); Emily Brimhall, Alpine, UT (US); Joe Fox, Spanish Fork, UT (US); Jedediah Knight, Provo, UT (US); Joseph Duncan, Provo, UT (US)

(73) Assignee: Hall Labs LLC, Provo, UT (US)

( * ) Notice: Subject to any disclaimer, the term of this patent is extended or adjusted under 35 U.S.C. 154(b) by 102 days.

(21) Appl. No.: 15/220,969

(22) Filed: Jul. 27, 2016

(65) Prior Publication Data
US 2018/0030781 A1    Feb. 1, 2018

(51) Int. Cl.
*E06B 9/386* (2006.01)
*H02S 20/32* (2014.01)
(Continued)

(52) U.S. Cl.
CPC .............. *E06B 9/386* (2013.01); *E06B 9/322* (2013.01); *H02S 20/22* (2014.12); *H02S 20/32* (2014.12);
(Continued)

(58) Field of Classification Search
CPC ............ E06B 9/386; E06B 2009/2476; E06B 2009/1505; H02S 20/32; H02S 20/30; H02S 30/10; H02S 30/20
See application file for complete search history.

(56) References Cited

U.S. PATENT DOCUMENTS 3,039,155 A * 6/1962 Iacovoni ................ E06B 7/082
160/104
4,091,592 A * 5/1978 Berlad ...................... E04C 2/54
160/107

(Continued)

FOREIGN PATENT DOCUMENTS

GB          2455753 A *  6/2009 ............. E06B 9/386
WO    WO-2012087019 A2 *  6/2012 ............... E06B 9/36
WO    WO-2017086810 A1 *  5/2017

*Primary Examiner* — Johnnie A. Shablack

(57) ABSTRACT

The system includes a headrail, which includes a motor, a gearbox, and one or more tiltable slats. At least one slat includes sliding tracks. The system further includes one or more PV cells movably disposed within the sliding tracks. The PV cells slide in move along the tracks with regard to an amount of sunlight incident on the cells. Methods of operating a solar powered window covering are also disclosed. The methods generally include detecting a tilt of at least one window covering slat. The slat includes one or more PV cells disposed in sliding tracks in the slat, and the tilt indicates an amount of sunlight incident on the cells. The methods also include sliding the PV cells in the tracks with regard to the amount of sunlight incident on the cells.

20 Claims, 18 Drawing Sheets

(51) Int. Cl.
- *H02S 30/10* (2014.01)
- *H02S 30/20* (2014.01)
- *E06B 9/322* (2006.01)
- *H02S 20/22* (2014.01)
- *E06B 9/24* (2006.01)
- *E06B 9/28* (2006.01)

(52) U.S. Cl.
CPC .............. *H02S 30/10* (2014.12); *H02S 30/20* (2014.12); *E06B 2009/2476* (2013.01); *E06B 2009/285* (2013.01)

(56) References Cited

U.S. PATENT DOCUMENTS

| | | | | |
|---|---|---|---|---|
| 4,159,710 | A * | 7/1979 | Prast | F24S 50/20 126/582 |
| 4,304,218 | A * | 12/1981 | Karlsson | F24S 20/63 126/607 |
| 5,221,363 | A * | 6/1993 | Gillard | E06B 9/264 136/248 |
| 5,413,161 | A * | 5/1995 | Corazzini | E06B 9/32 160/168.1 P |
| 5,517,094 | A * | 5/1996 | Domel | E06B 9/307 160/168.1 P |
| 5,532,560 | A * | 7/1996 | Element | E06B 9/32 160/176.1 P |
| 5,698,958 | A * | 12/1997 | Domel | E06B 9/307 318/480 |
| 5,760,558 | A * | 6/1998 | Popat | E06B 9/32 160/168.1 R |
| 5,793,174 | A * | 8/1998 | Kovach | E06B 9/262 318/16 |
| 5,818,183 | A * | 10/1998 | Lambert | E06B 9/32 318/286 |
| 5,907,227 | A * | 5/1999 | Domel | E06B 9/307 318/480 |
| 6,060,852 | A * | 5/2000 | Domel | E06B 9/307 318/480 |
| 6,239,910 | B1 * | 5/2001 | Digert | E06B 9/28 160/104 |
| 6,378,248 | B1 * | 4/2002 | Jordal | E06B 7/094 49/64 |
| 6,789,597 | B2 * | 9/2004 | Wen | E06B 9/304 160/168.1 P |
| 6,812,662 | B1 * | 11/2004 | Walker | E06B 9/322 136/243 |
| 7,077,123 | B2 * | 7/2006 | Jarvinen | E06B 7/08 126/573 |
| 7,617,857 | B2 * | 11/2009 | Froese | E06B 9/386 160/10 |
| 8,338,694 | B2 * | 12/2012 | Hoffman | E06B 9/264 136/246 |
| 8,365,468 | B2 * | 2/2013 | Weekes | E04F 10/08 49/381 |
| 8,365,800 | B2 * | 2/2013 | Oh | E06B 9/322 160/168.1 P |
| 8,413,705 | B2 * | 4/2013 | Castel | E04B 7/163 160/107 |
| 8,471,464 | B2 * | 6/2013 | Yamada | E06B 9/303 313/504 |
| 8,477,081 | B2 * | 7/2013 | Daniel | G09F 9/33 345/1.3 |
| 8,525,462 | B2 * | 9/2013 | Berman | E06B 9/322 318/286 |
| 8,528,621 | B2 * | 9/2013 | Murphy, Jr. | E04F 10/10 160/5 |
| 8,624,529 | B2 * | 1/2014 | Neuman | E06B 9/386 160/10 |
| 8,678,067 | B2 * | 3/2014 | Berezhnyy | E06B 9/24 160/1 |
| 8,678,069 | B2 * | 3/2014 | Choi | E06B 9/264 160/107 |
| 8,723,466 | B2 * | 5/2014 | Chambers | E05F 15/79 160/166.1 |
| 8,820,388 | B2 * | 9/2014 | Mullet | E06B 9/322 160/310 |
| 8,837,049 | B2 * | 9/2014 | Tandler | G02B 17/006 160/187 |
| 8,939,190 | B2 * | 1/2015 | Mullet | E06B 9/307 160/176.1 P |
| 9,057,535 | B2 * | 6/2015 | Frazier | H01L 31/0547 |
| 9,091,115 | B2 * | 7/2015 | Mullet | E06B 9/307 |
| 9,163,452 | B2 * | 10/2015 | Zhang | E06B 9/386 |
| 9,217,582 | B2 * | 12/2015 | Frazier | H02S 30/20 |
| 9,244,261 | B2 * | 1/2016 | Tandler | G02B 17/006 |
| 9,261,630 | B2 * | 2/2016 | Hoffman | E06B 9/264 |
| 9,695,634 | B2 * | 7/2017 | Diederiks | E06B 9/68 |
| 10,205,421 | B2 * | 2/2019 | Hall | H02S 40/36 |
| 2003/0168056 | A1 * | 9/2003 | Fidler | E06B 9/386 126/628 |
| 2005/0022946 | A1 * | 2/2005 | Domel | E06B 9/322 160/168.1 P |
| 2005/0102934 | A1 * | 5/2005 | Winarski | E06B 9/264 52/204.6 |
| 2007/0056579 | A1 * | 3/2007 | Straka | E04D 13/033 126/570 |
| 2007/0163732 | A1 * | 7/2007 | Konstantin | A47H 23/06 160/237 |
| 2007/0251569 | A1 * | 11/2007 | Shan | H01L 31/052 136/246 |
| 2009/0114264 | A1 * | 5/2009 | Giampietro | B63H 9/06 136/244 |
| 2009/0151878 | A1 * | 6/2009 | Konstantin | A47H 23/06 160/237 |
| 2010/0243025 | A1 * | 9/2010 | Bhatia | H01L 31/02021 136/244 |
| 2010/0275534 | A1 * | 11/2010 | Ruskin | E04D 1/26 52/173.3 |
| 2011/0007498 | A1 * | 1/2011 | Maier | F21S 9/037 362/183 |
| 2011/0030761 | A1 * | 2/2011 | Kalkanoglu | E04D 5/12 136/245 |
| 2011/0048656 | A1 * | 3/2011 | Chu | E06B 9/28 160/310 |
| 2011/0126992 | A1 * | 6/2011 | Yordanova | E06B 9/386 160/127 |
| 2011/0214712 | A1 * | 9/2011 | Frazier | H02S 30/20 136/248 |
| 2011/0251720 | A1 * | 10/2011 | Neuman | E06B 9/32 700/275 |
| 2011/0253319 | A1 * | 10/2011 | Schaupp | E06B 9/262 160/127 |
| 2012/0011782 | A1 * | 1/2012 | Kolas | E06B 9/264 52/173.3 |
| 2012/0073765 | A1 * | 3/2012 | Hontz | E06B 9/304 160/84.02 |
| 2012/0152469 | A1 * | 6/2012 | Choi | E06B 9/264 160/127 |
| 2012/0167872 | A1 * | 7/2012 | Lin | F24S 23/30 126/600 |
| 2012/0173143 | A1 * | 7/2012 | Belenkii | G01C 21/02 701/513 |
| 2012/0216964 | A1 * | 8/2012 | Xu | E06B 9/264 160/6 |
| 2012/0273023 | A1 * | 11/2012 | Ely | H02S 20/23 136/246 |
| 2012/0299470 | A1 * | 11/2012 | Kobayashi | E06B 9/386 313/504 |
| 2013/0146123 | A1 * | 6/2013 | Park | H01L 31/052 136/246 |
| 2013/0199515 | A1 * | 8/2013 | Tandler | E06B 7/086 126/623 |
| 2013/0206213 | A1 * | 8/2013 | He | H01L 31/048 136/251 |
| 2013/0247954 | A1 * | 9/2013 | Kunz | E06B 7/28 136/244 |
| 2013/0278989 | A1 * | 10/2013 | Lam | B60J 3/04 359/275 |

(56) References Cited

U.S. PATENT DOCUMENTS

| | | | |
|---|---|---|---|
| 2014/0020852 A1* | 1/2014 | Thielemann | F04D 25/0606 160/127 |
| 2014/0102510 A1* | 4/2014 | Kalus | F24S 23/74 136/246 |
| 2014/0111007 A1* | 4/2014 | Liao | H02J 7/355 307/23 |
| 2014/0116497 A1* | 5/2014 | Sanders | E06B 7/086 136/246 |
| 2015/0096607 A1* | 4/2015 | Yong | H01L 31/05 136/244 |
| 2015/0101761 A1* | 4/2015 | Moslehi | E06B 9/386 160/107 |
| 2015/0348401 A1* | 12/2015 | Hall | H02P 29/027 340/12.54 |
| 2016/0064588 A1* | 3/2016 | Paull | H01L 31/0543 136/259 |
| 2016/0258654 A1* | 9/2016 | Hoffman | E06B 9/264 |
| 2017/0138124 A1* | 5/2017 | Kanno | E06B 9/386 |
| 2017/0149375 A1* | 5/2017 | Bailey | H02S 20/32 |
| 2017/0204658 A1* | 7/2017 | Kin | E06B 9/368 |
| 2018/0023338 A1* | 1/2018 | Werner | E04F 10/08 160/167 R |
| 2018/0030781 A1* | 2/2018 | Hall | E06B 9/386 |
| 2018/0076762 A1* | 3/2018 | Hall | H02S 40/36 |
| 2018/0097471 A1* | 4/2018 | Livsey | F24S 25/61 |
| 2018/0195766 A1* | 7/2018 | Cheun | E06B 9/264 |
| 2018/0204967 A1* | 7/2018 | Hall | H01L 31/048 |
| 2018/0283734 A1* | 10/2018 | Tarabour | F24S 50/20 |

\* cited by examiner

SOLAR-POWERED WINDOW COVERING

TECHNICAL FIELD

This invention relates generally to the field of home automation, and more specifically to automated window coverings.

BACKGROUND

Efficient, renewable power for electronic devices has become a social imperative. Thus, consumers are increasingly demanding that automated mechanical devices incorporate renewable energy resources and/or resource capture. In the field of window coverings, one resource is solar power. However, efficiency and aesthetics of solar-power solutions for window coverings remain significant issues. Other solutions have tried to address these issues. For example, several manufacturers incorporate solar panels into horizontal window blind slats. However, such solutions are visually unsettling, both outside and inside a room. Additionally, such solutions require the window covering to be adjusted at specific angles to maximize efficiency of the solar panels, limiting the use of the window covering to regulate natural light and temperature in a room. Other solutions include incorporating solar cells into vertical roller shades, coating windows with photovoltaic thin films, or otherwise attaching solar cells to windows. While these improve aesthetics, efficiency is significantly limited by the fixed vertical orientation of the solar cells. Thus, a solution is still needed that maximizes the efficiency of the solar cells while still leaving the window covering useful for regulating natural light and temperature, and leaves aesthetics unimpacted.

SUMMARY OF THE INVENTION

A solar powered window covering system is disclosed that overcomes the limitations discussed above. The system generally includes a motorized window covering with one or more photovoltaic (PV) cells incorporated into a strategically positioned slat of the window covering. The slat is positioned to maximize exposure time to sunlight, and the PV cells slide along the slat based on a tilt of the slat to minimize the angle of incidence of sunlight on the PV cells. One of skill in the art will immediately recognize the benefits of the system described herein. First, allowing the PV cells to slide along the slat allows the PV cells to adjust to maximum current while still leaving the window covering useful for regulating light and temperature. Second, the positioning of the solar cells limits the visual impact of the PV cells, improving aesthetics compared with other solutions.

In one embodiment of the claimed invention, a solar powered window covering system is disclosed. The system includes a headrail, which includes a motor, a gearbox, and one or more tiltable slats. At least one slat includes sliding tracks. The system further includes one or more PV cells movably disposed within the sliding tracks. The PV cells slide in the tracks with regard to an amount of sunlight incident on the cells.

A method of operating a solar powered window covering is also disclosed. The method includes detecting a tilt of at least one window covering slat. The slat includes one or more PV cells disposed in sliding tracks in the slat, and the tilt indicates an amount of sunlight incident on the cells. The method also includes sliding the PV cells in the tracks with regard to the amount of sunlight incident on the cells.

Another method of operating a solar powered window is also disclosed. The method includes detecting an amount of electrical current generated by a first PV cell disposed in sliding tracks in a window covering slat, and detecting an amount of electrical current generated by a second PV cell disposed in the sliding tracks. The amounts of current are compared, and the PV cells are slid in the tracks in a direction associated with the cell with the largest current.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and are not intended to limit the described elements to only the features described with regard to the other embodiments. Rather, each embodiment is distinct from each other embodiment.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1:
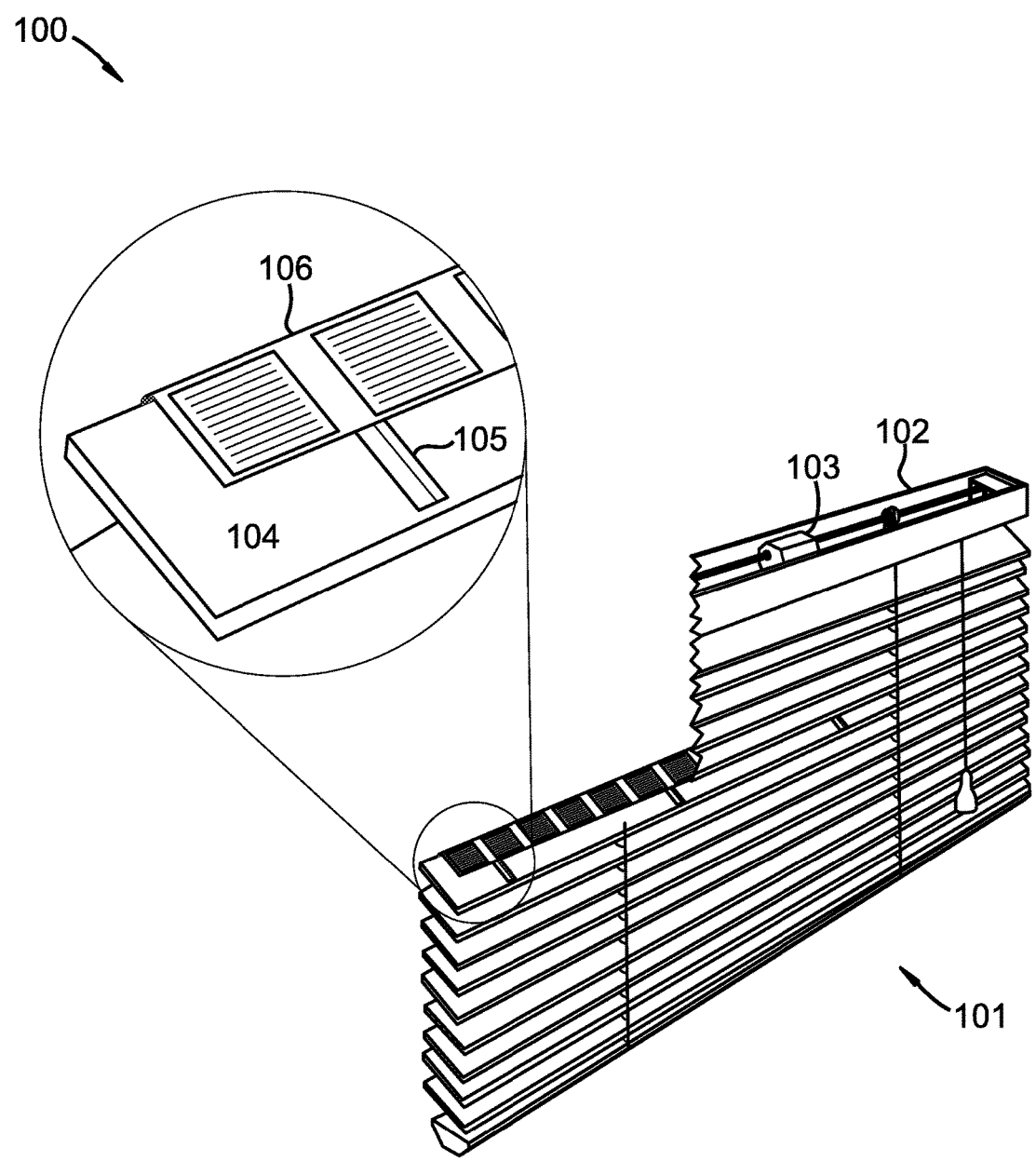
FIG. 1 depicts one embodiment of a solar-powered window covering.

FIG. 1 depicts one embodiment of a solar-powered window covering. Window covering system 100 includes window covering 101, headrail 102, motor and gearbox 103, one or more tiltable slats 104, sliding tracks 105, and photovoltaic (PV) cells 106. As shown, at least one slat 104 includes sliding track 104. PV cells 106 are movably disposed within sliding tracks 105, and PV cells 106 slide in tracks 105 with regard to an amount of sunlight incident on PV cells 106.

As depicted, window covering 101 includes a set of horizontal slats. However, in some embodiments, window covering 101 includes a set of vertical slats. Headrail 102 is similar to typical headrails used in known window covering systems. Headrail 102 includes a tilt assembly, including a tilt rod and motor and gearbox 103, and a housing. Headrail 102 mounts window covering 101 over a window associated with system 100. In some embodiments, headrail 102 also houses a battery for powering motor and gearbox 103.

Motor and gearbox 103 are, in some embodiments, any of a variety of off-the-shelf motor-and-gearbox assemblies for motorized adjustment of a window covering. In other embodiment, motor and gearbox 103 are automated and remotely controlled, such as the motor and gearbox provided in the Automation Kit sold by MySmartBlinds, a window blind automation retailer. Motor and gearbox 103 are powered in a variety of ways. For example, as described above, in some embodiments, motor and gearbox 103 are battery-powered. In other embodiments, motor and gearbox 103 are powered directly by solar power, with a battery as backup power. In yet other embodiments, motor and gearbox 103 are powered by mains power and supplemented by battery and/or solar power.

Slats 104 are, in some embodiments, any of a variety of off-the-shelf window blind slats, such as wood slats, aluminum slats, plastic slats, and/or slats made of composite materials. In some embodiments, slats 104 are hollow, and house components for sliding PV cells 106 in tracks 105 (described below in more detail with regard to FIGS. 6A-C). Tracks 105 are incorporated with slats 104 to guide PV cells 106 along slats 104 and, in some embodiments, to hold PV cells 106 to slats 104. In some embodiments, tracks 105 are cut into slats 104. In other embodiments, tracks 105 include endcaps on slats 104. Embodiments of tracks 105 are described in more detail with regard to FIGS. 7 and 8.

PV cells 106 are any of a variety of off-the-shelf flexible PV cells. PV cells 106 are flexible enough to curve around an edge of slats 104. In some embodiments, PV cells 106 are flexible enough to curve 180° with diameter ranging from ¹⁄₁₆-inch to ¼-inch. In one such embodiment, PV cells 106 are thin-film solar cells mounted to a flexible plastic substrate.

PV cells 106 slide in tracks 105 across and around slats 104 to maximize an amount of sunlight absorbed by PV cells 106 while still allowing for window covering 101 to be tilted in any desired way. For example, in one embodiment, window covering 101 is tilted so that slats 104 are perpendicular to a window associated with system 100. PV cells 106 are positioned on a top side of slats 104. A user adjusts slats 104 to reduce light let into a room associated with system 100 by tilting slats 104 so that slats 104 are nearly parallel to the window, and the top side of slats 104 faces into the room. PV cells 106 detect the changed tilt and slide in tracks 105 to a bottom side of slats 104 facing the window.

In some embodiments, PV cells 105 are positioned on several slats 104. For example, in some embodiments, PV cells 105 are positioned on all slats 104. In other embodiments, PV cells 105 are positioned on only a few slats 104 of window covering 101. In one embodiment, PV cells 105 are positioned on one slat 104. In such an embodiment, PV cells 104 are positioned on a slat 104 with maximum exposure to sunlight (as is described in more detail with regard to FIG. 9).

PV cells 105 are controlled in any of a variety of ways. In some embodiments, a position of PV cells 105 on slats 104 is controlled electromechanically via microcontroller and motor. In other embodiments, the position of PV cells 105 on slats 104 is controlled mechanically. Some such electromechanical and mechanical means are described in further detail below with regard to FIGS. 4-6C. PV cells 106 provide power for operating system 100. In some embodiments, PV cells 106 directly power motor and gearbox 103. In the same or other embodiments, PV cells 106 charge a battery that powers motor and gearbox 103. Additionally, in the same or other embodiments, PV cells 106 power a motor that slides PV cells 106 along slats 104. In some cases, the battery is fully charged and the motor and/or motor and gearbox 103 are unused, but PV cells 106 are converting sunlight into power. Some embodiments address such cases by including wiring connecting PV cells 106 to a common electricity circuit for a structure associated with system 100. In such embodiments, PV cells 106 are used to power other electrical devices around the structure, and/or are send power back to a power grid associated with the structure. In other embodiments, PV cells 106 are networked to additional backup batteries.

In some embodiments (not shown), system 100 includes a light-impermeable covering positioned over PV cells 106. For example, in some cases, a user does not intend to use or adjust a window covering for an extended period of time, such as when the user goes on vacation. In such cases, it is useful to cover PV cells 106 to prevent cells 106 from generating power. In one embodiment, the covering is incorporated into each corresponding slat 104, and slides in tracks 105 to cover PV cells 106. In another embodiment, the covering is detachable from slats 104.

Figure 2:
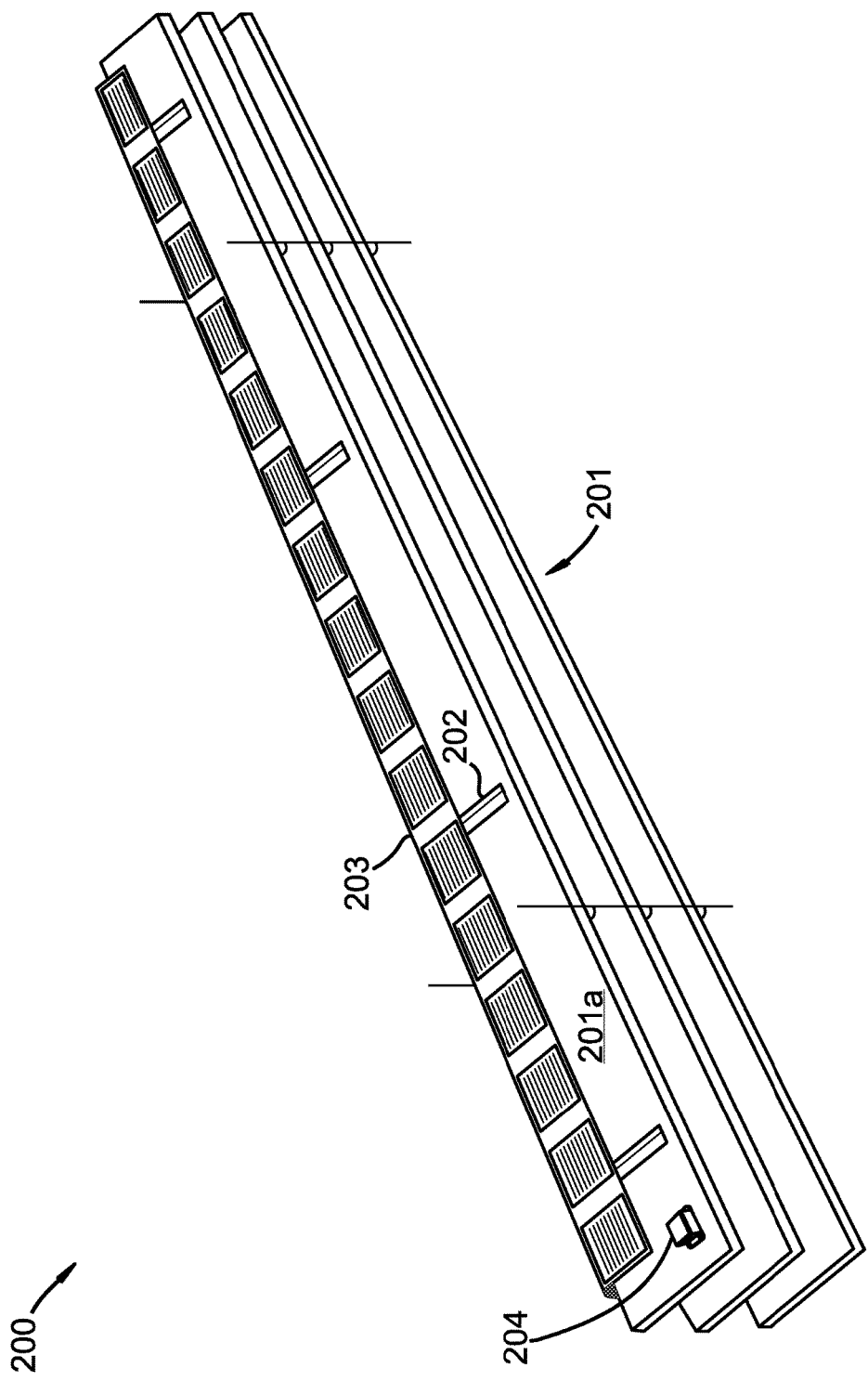
FIG. 2 depicts a partial embodiment of a window covering with PV cells mounted to a window blind slat having an inclinometer.

FIG. 2 depicts a partial embodiment of a window covering with PV cells mounted to a window blind slat having an inclinometer. Window covering 200 includes slats 201, sliding tracks 202 in one slat 201, PV cells 203, and inclinometer 204 coupled to at least on slat 201. Inclinometer 204 indicated an amount of sunlight incident on PV cells 203 by detecting a tilt of slats 201.

Slats 201, sliding tracks 202, and PV cells 203 are similar to those described above with regard to FIG. 1. Inclinometer 204 is any of a variety of off-the-shelf MEMS inclinometers. In some embodiments, inclinometer 204 is hardwired to a microcontroller associated with window covering 200 (not shown, but similar to that described below with regard to FIG. 4), and communicates an angle of tilt of slats 201 with the microcontroller. The microcontroller processes the tilt information and instructs PV cells 203 to slide in tracks 202 based on the tilt information. For example, in one embodiment, the microcontroller stores information about a location on the earth relative to the sun of window covering 200. Additionally or alternatively, the microcontroller stores date and time information, and associates the date and time information with a position of the sun in the sky relative to window covering 200. Based on tilt information sent to the microcontroller from inclinometer 204, and based on the position of the sun in the sky, the microcontroller sends instructions to adjust PV cells 203 to maximize power generated by PV cells 203.

In one specific embodiment, the sun is at its apex in the sky, and inclinometer 204 indicates a top side 201a of slats 201 is perpendicular to light emanating from the sun. Based on that indication, PV cells 203 are slid in tracks 202 to the top side 201a. In another specific embodiment, inclinometer 204 indicates a bottom side of slats 201 is perpendicular to light emanating from the sun. Based on that indication, PV cells 203 are slid in tracks 202 to the bottom side of slats 201.

Figure 3:
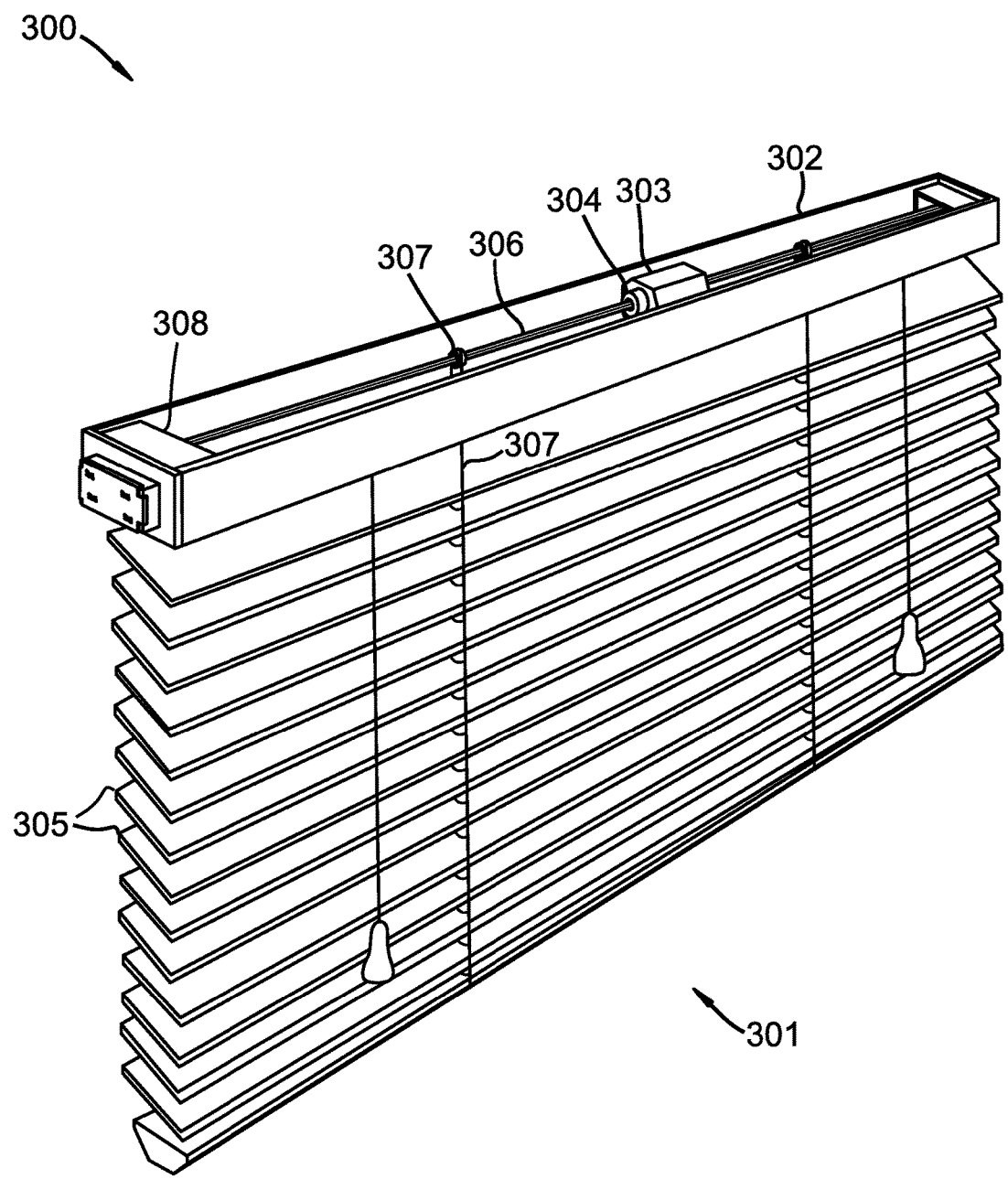
FIG. 3 depicts an embodiment of a solar-powered window covering system using a potentiometer that detects a tilt of window covering slats.

FIG. 3 depicts an embodiment of a solar-powered window covering system using a potentiometer that detects a tilt of window covering slats. System 300 includes window covering 301, headrail 302, motor and gearbox 303, potentiometer 304, slats 305, tilt rod 306, strings 307, and battery 308. Potentiometer 304 is coupled to strings 307 (as depicted, via tilt rod 306), and strings 307 tilt slats 305. Potentiometer 304 indicates an amount of sunlight incident on PV cells associated with system 300 (not shown, but similar to that described above with regard to FIGS. 1-2) by detecting a tilt of slats 305.

Window covering 301, headrail 302, motor and gearbox 303 and slats 305 are similar to those described above with regard to FIGS. 1-2. Potentiometer 304 is any of a variety of off-the-shelf potentiometers. Tilt rod 306 extends through motor and gearbox 303 and across headrail 302. Tilt rod 306 is made of any of a variety of materials suitable for sustaining rotational strain. String 307 is coupled to tilt rod 306 and provides support for slats 305. String 307 is made of any of a variety of materials, such as nylon, polyester, cotton, or other polymers commonly used for string. Battery 308 is any of a variety of off-the-shelf rechargeable batteries. Battery 308 stores at least enough energy to power motor and gearbox 303 for 6-12 months of regular use. For example, in one embodiment, battery 308 stores enough power for 10 adjustments per day for 12 months before needing a recharge (without solar charging). As depicted, battery 308 is positioned in headrail 302. However, in other embodiments, battery 308 is positioned outside headrail 302. In yet other embodiments, battery 308 is housed inside motor and gearbox 303.

As depicted, potentiometer 304 is indirectly coupled to string 307 via tilt rod 306. In some such embodiments, potentiometer 304 is directly coupled to tilt rod 306. However, in some embodiments, potentiometer 304 is directly coupled to string 307. Potentiometer 304 indicates a tilt of slats 305 by conveying a voltage to a microcontroller (not shown, but similar to the microcontroller described below with regard to FIG. 4). In some embodiments, the microcontroller stores an algorithm that associates a voltage indicated by potentiometer 304 with a tilt of slats 305. As the voltage changes, the microcontroller calculates the tilt of slats 305 and slides the PV cells in tracks in slats 305 (not depicted but similar to that described above with regard to FIGS. 1-2), maximizing an amount of sunlight incident on the PV cells. In other embodiments, the microcontroller stores a table that associates the voltage indicated by potentiometer 304 with the tilt of the slats.

Figure 4:
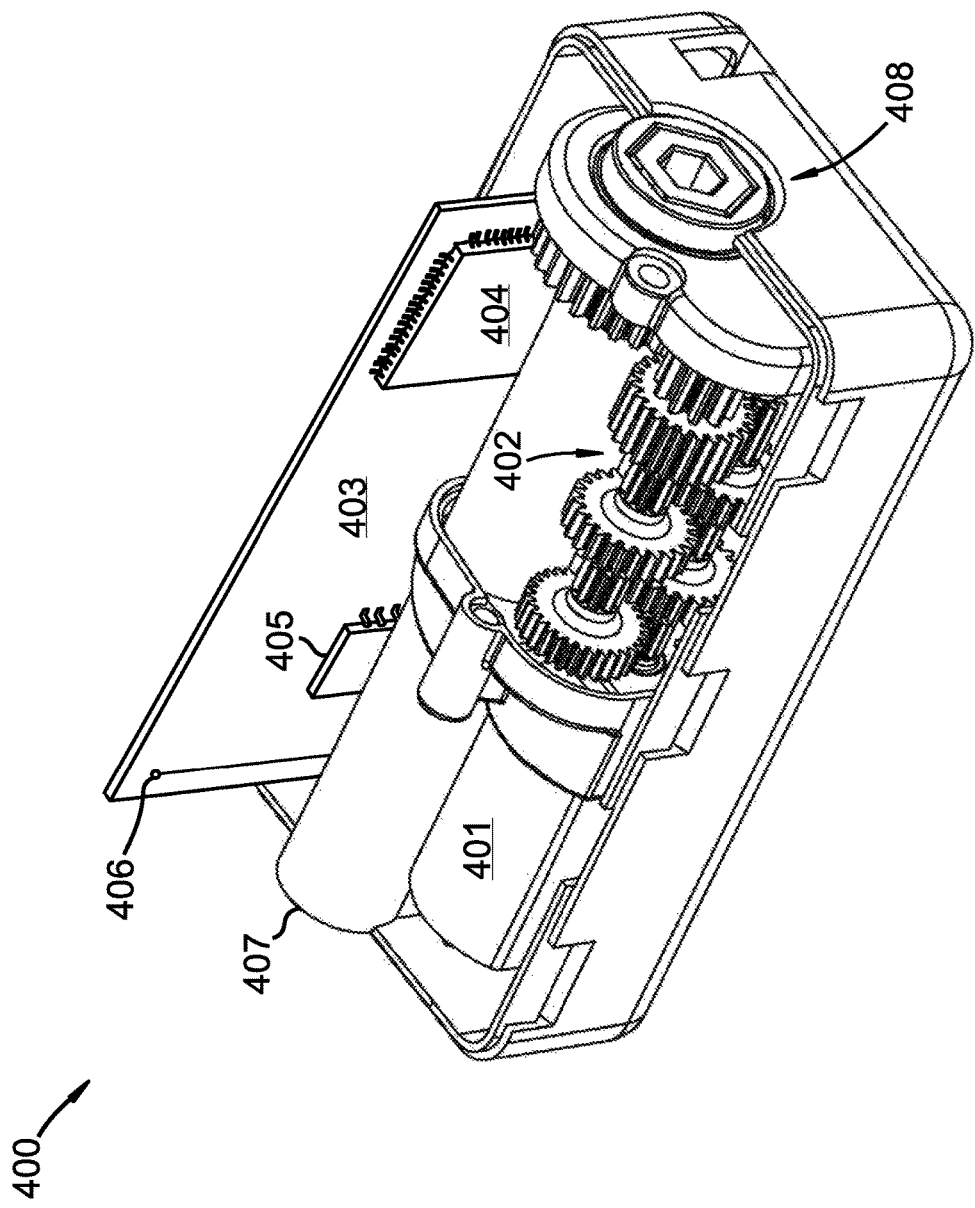
FIG. 4 depicts one embodiment of a suitable motor and gearbox for use in a solar-powered window covering.

FIG. 4 depicts one embodiment of a suitable motor and gearbox for use in a solar-powered window covering. Motor and gearbox 400 includes motor 401, gears 402, printed circuit board (PCB) 403, microcontroller 404, transceiver 405, antenna 406, output shaft 407, and tilt rod coupler 408. Similar to that described above with regard to FIGS. 1-3, microcontroller 404 is programmed with instructs to instruct motor 401 to tilt slats (not shown, but similar to those depicted in FIGS. 1-3) to maximize a current generated by one or more PV cells on the slats (not depicted, but similar to those depicted in FIGS. 1-3).

Motor 401 is any of a variety of off-the-shelf and/or custom manufactured DC motors capable of handling loads up to the combined weight of the slats. However, depending on the gear ratio of gears 402 relative to output shaft 407 (described in more detail below), motor 401 can have a maximum load capacity of much less than the combined weight of the slats. Motor 401 is powered in a variety of ways. In some embodiments, motor 401 is directly powered by the PV cells. In the same or other embodiments, motor 401 is indirectly powered by the PV cells via a battery charged by the PV cells. Similarly, some embodiments include powering motor 401 via mains power.

Gears 402 have one or more stages of gears to reduce the gear ratio of motor 401. In some embodiments, the gear ratio may be between 100:1 and 1000:1. For example, in one embodiment, the gear ratio is 720:1 (i.e., seven hundred and twenty turns of the motor 401 produces a single turn of tilt rod coupler 408).

PCB 403 is any of a variety of off-the-shelf and/or custom manufactured PCBs. As depicted, PCB 403 is oriented vertically in motor and gearbox 400. However, PCB 403 is oriented in a variety of other ways in other embodiments. For example, in one embodiment, PCB 403 is mounted above motor 401 and gears 402. In another embodiment, PCB 403 is mounted below motor 401 and gears 402. In yet another embodiment, PCB 403 is housed and mounted separately from motor and gearbox 400 in a headrail of the solar-powered window covering. PCB 403 networks microcontroller 404 with transceiver 405 and motor 401. Components networked to PCB 403, such as microcontroller 404, transceiver 405, and motor 401, are powered in a variety of ways, such as directly by the PV cells, indirectly by the PV cells via a battery, or at least in part by mains power.

Microcontroller 404 and transceiver 405 are any of a variety of off-the-shelf and/or custom manufactured devices. For example, in some embodiments, transceiver 405 is one or more of a WiFi transceiver, Bluetooth transceiver, Zigbee transceiver, or Z-wave transceiver. In some embodiments, transceiver 405 is a SureFi transceiver (SureFi is a long-range, low data wireless spread spectrum frequency hopping protocol on the 902-928 MHz ISM band). Antenna 406 is an antenna suitable for use with transceiver 405.

As shown, motor 401 drives gears 402 coupled to output shaft 407. Output shaft 407 drives a tilt rod (not shown, but similar to that depicted above with regard to FIGS. 1 and 3). In the depicted embodiment, output shaft 407 extends the length of motor and gearbox 400. Output shaft 407 includes a through-channel, extending the length of the output shaft 407, to enable the tilt rod to pass therethrough. As depicted, the through-channel (along with any required adapter inserts) includes tilt rod coupler 408 that interlocks with, and applies torque to, the tilt rod. In some embodiments, output shaft 407 rides on bearing surfaces at each end of motor and gearbox 400.

Microcontroller 404 stores instructions for operating motor 401 and, in some embodiments, for sliding the PV cells in tracks along the slats. In embodiments where microcontroller 404 controls the PV cells, microcontroller 404 receives tilt information about the slats, such as from an inclinometer or potentiometer (similar to those described above with regard to FIGS. 2-3, respectively). Based on the tilt information, microcontroller 404 instructs the PV cells to adjust position by sliding in the tracks. In some embodiments, microcontroller 404 also controls power allocation of power generated by the PV cells. For example, in some embodiments, microcontroller 404 directs power from the PV cells to charge a battery. In some embodiments, microcontroller 404 diverts power from charging the PV cells to power motor 401. In embodiments where the PV cells do not generate enough power to fully power motor 401, microcontroller 404 additionally draws power from the battery to power motor 401.

Figure 5A:
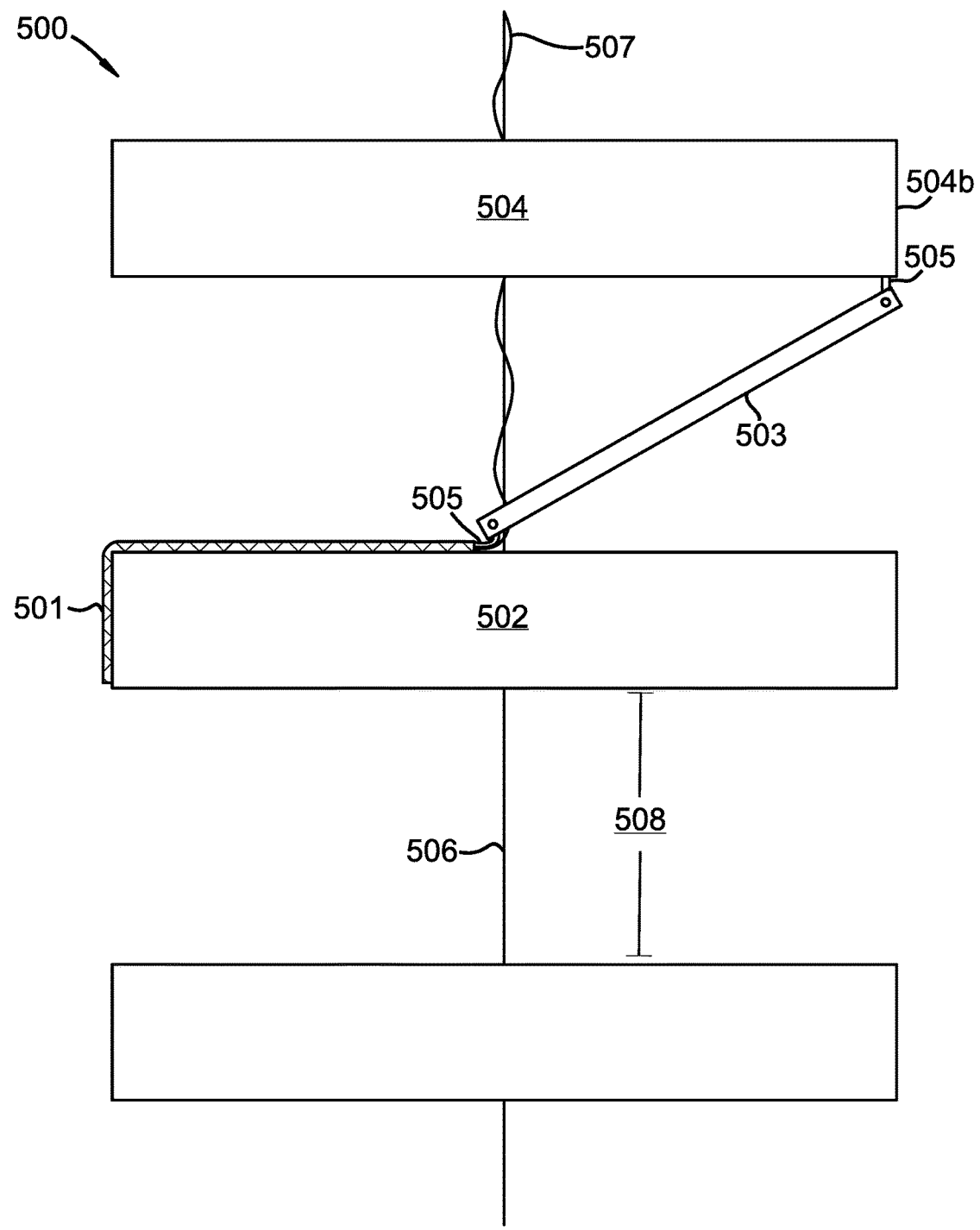
FIGS. 5A-B depict an embodiment of a mechanically adjustable PV cell for use with a solar-powered window covering system.
Figure 5B:
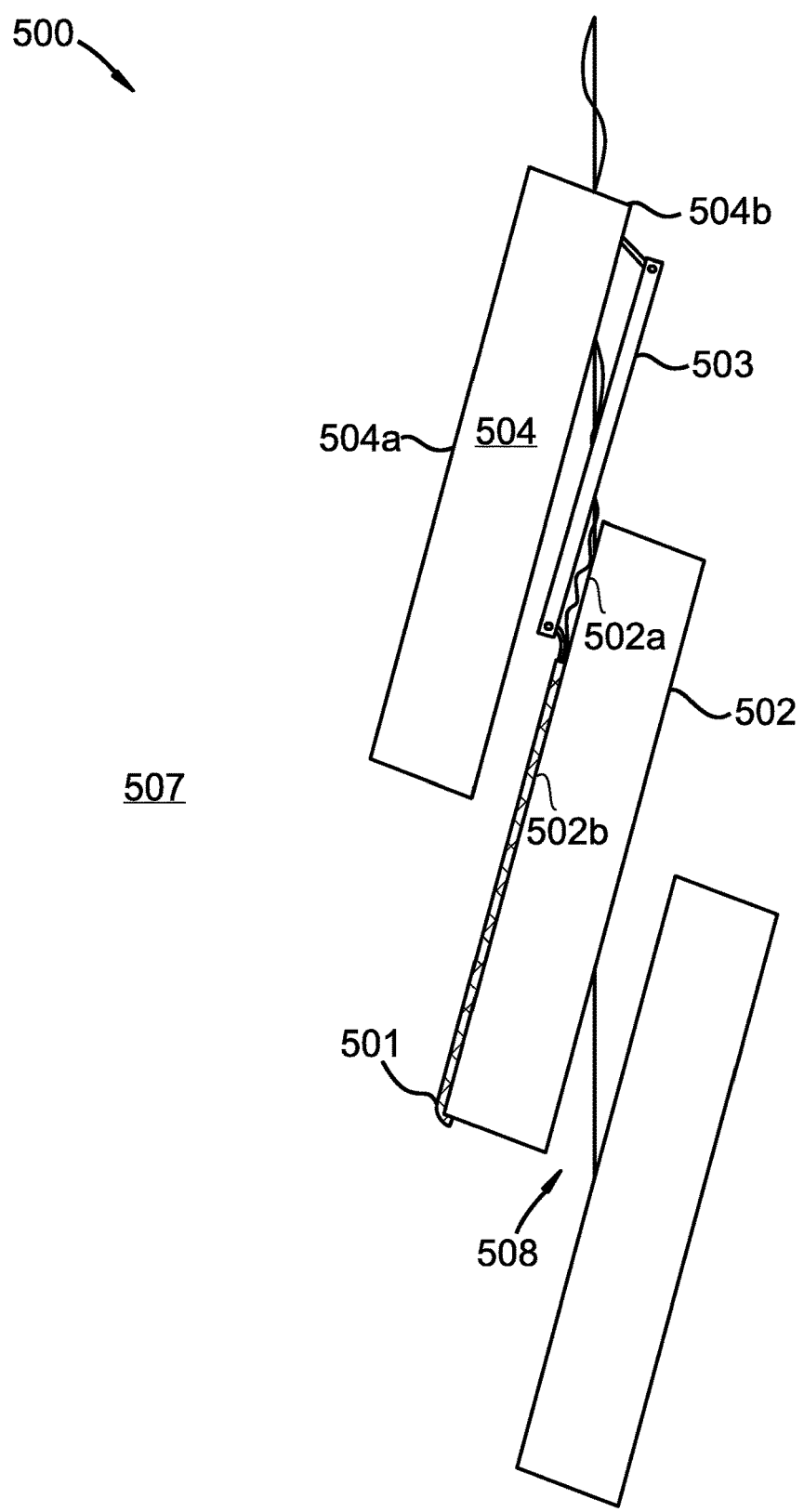

FIGS. 5A-B depict an embodiment of a mechanically adjustable PV cell for use with a solar-powered window covering system. As depicted in FIG. 5A, PV cells 501 are positioned on window covering slat 502. Rigid coupling member 503 couples PV cells 501 to outside edge 504*b* of slat 504 above PV cells 501 and slat 502. Coupling member 503 forces PV cells 501 to slide in tracks (not shown, but similar to the tracks described above with regard to FIGS. 1-2) when a tilt of the window covering is adjusted. Slats 502 and 504 are hung from a headrail by string 506, and PV cells 501 transmit.

FIG. 5B depicts slats 502, 504 tilted such that top sides 502*a*, 504*a* of each slat faces window side 507 of the window covering system. When slats 502, 504 are tilted as such, a distance between center point 502*b* and outside edge 504*b* increases, whereas a length of rigid coupler 503 remains fixed. As a result, PV cells 501 are pulled by rigid coupler 503 over a larger section of top side 502*a*. This embodiment is particularly beneficial where PV cells 501 cover a portion of width 502*c* when slat 502 is horizontally tilted that is less in length than inter-slat spacing 508.

Figure 6A:
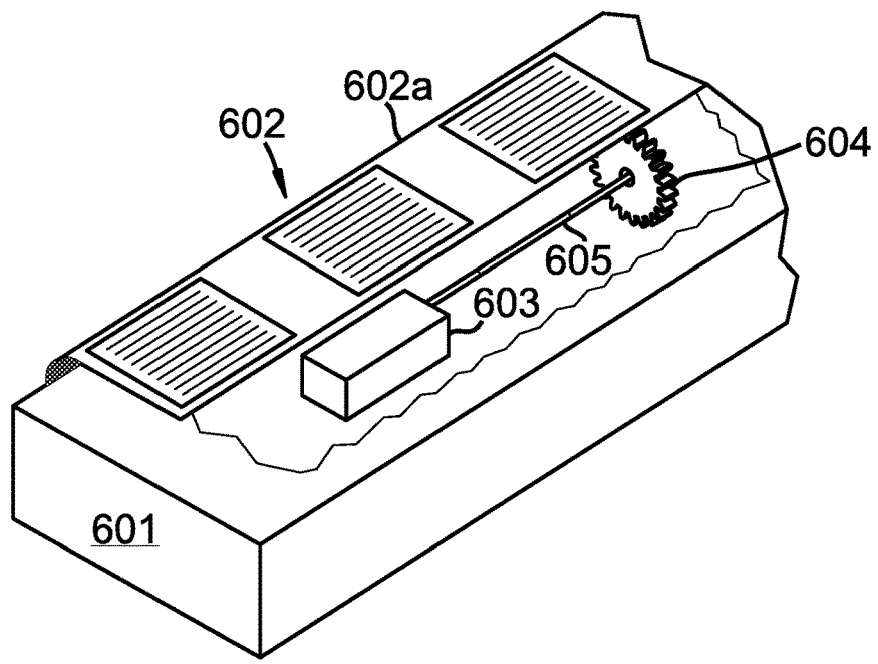
FIGS. 6A-C depict an embodiment of a slat having an internal motor and gear that slides PV cells in tracks on the slat.
Figure 6B:
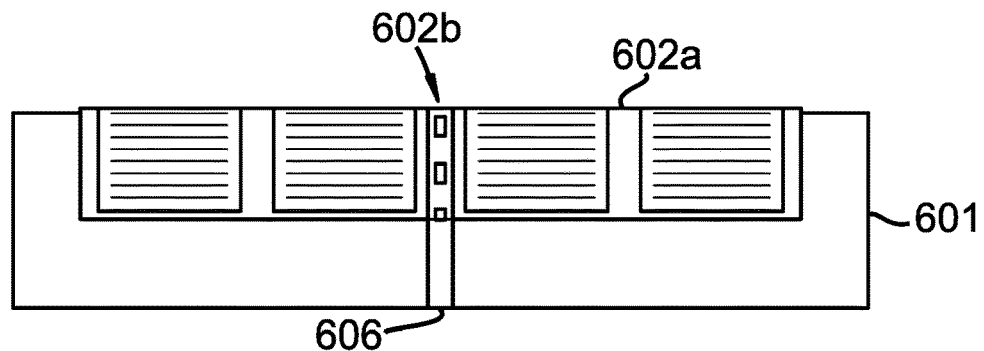
Figure 6C:
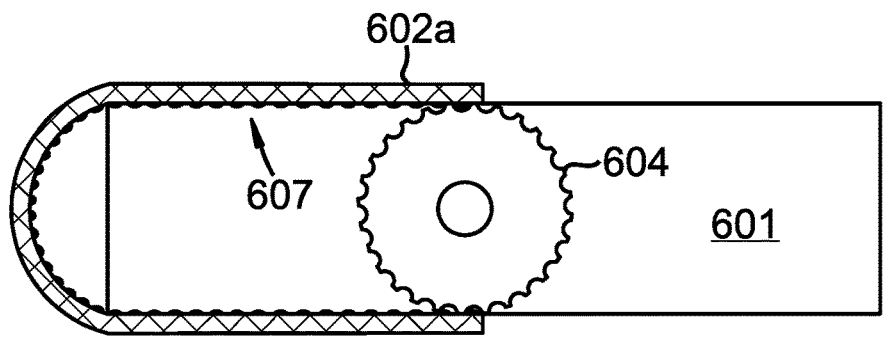

FIGS. 6A-C depict an embodiment of a slat having an internal motor and gear that slides PV cells in tracks on the slat. As depicted in FIG. 6A, slat 601 includes PV cells 602, motor 603, gear 604, and power transfer rod 605. Motor 603, gear 604 and power transfer rod 605 are embedded in slat 601. Motor 603 and gear 604 force PV cells 602 to slide in tracks (depicted in FIG. 6B, and similar to those depicted in FIGS. 1-2 above) when a tilt of a window covering associated with slat 601 is adjusted.

Motor 603 is a DC micro-motor having a thickness ranging from 1-6 mm. In some embodiments, several motors 603 are necessary to slide PV cells 602 in the tracks. PV cells 602 are mounted to flexible material 602*a*. In some embodiments, motor 603 is coupled to several gears 604 disposed along power transfer rod 605. Additionally, in some alternative embodiments, motor 603 transfers power to gear 604 via a horizontal gear. In some embodiments, a gear ratio between motor 603 and gear 604 ranges from 1:1 to 1000:1 (motor rotations:gear rotations). Gear 604 is positioned in the sliding track.

As depicted in FIG. 6B, in some embodiments, flexible material 602*a* includes perforations 602*b* to fit over teeth of gear 604. As gear 604 rotates, gear 604 engages flexible material 602*a* and slides PV cells 602 in sliding track 606. As depicted in FIG. 6C, in some embodiments, flexible material 602*a* includes teeth 607 protruding into track 606 that engage teeth of gear 604.

Figure 7:
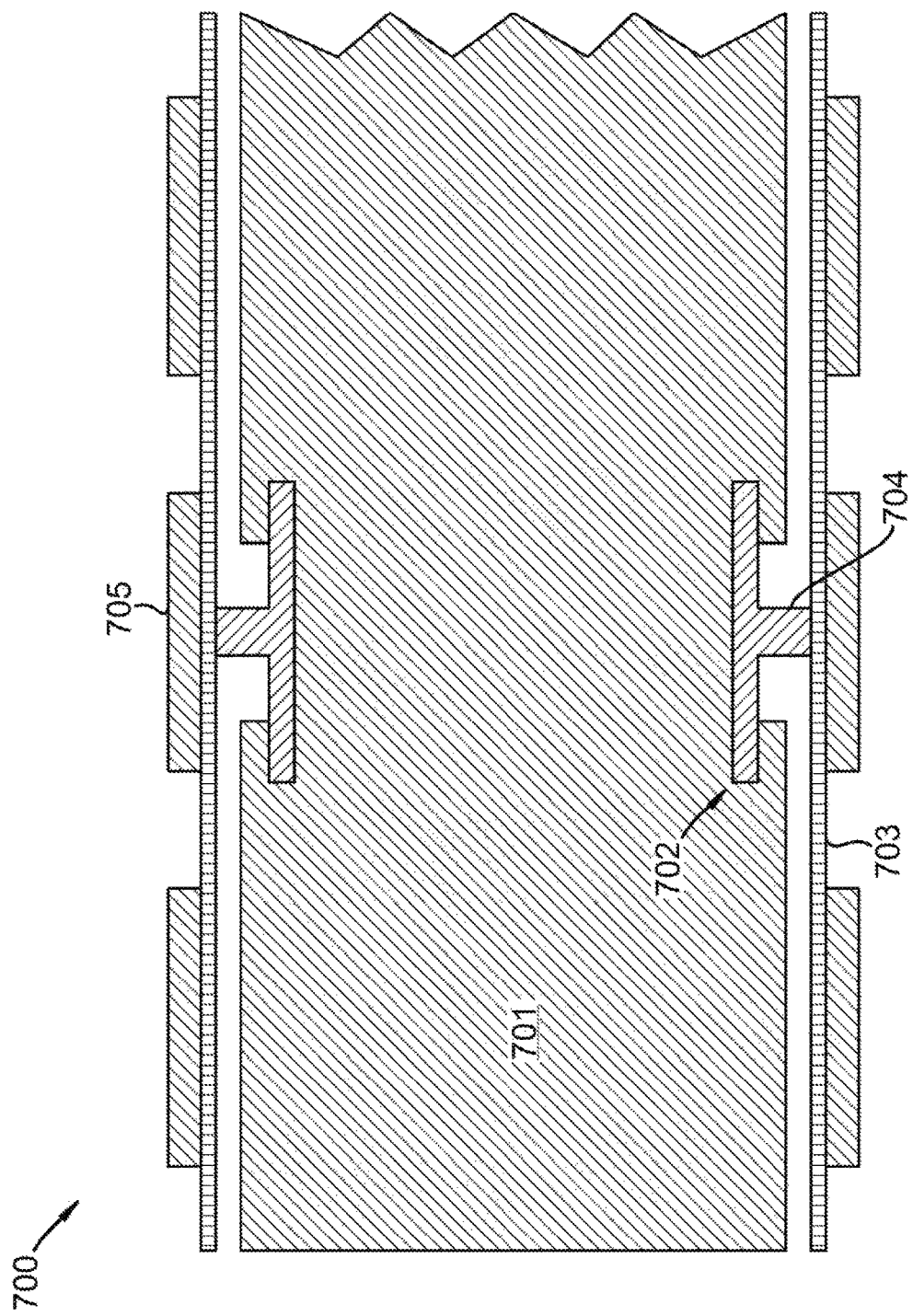
FIG. 7 depicts one embodiment of sliding tracks in a slat for a solar-powered window covering system.

FIG. 7 depicts one embodiment of sliding tracks in a slat for a solar-powered window covering system. Slat 701 includes track 702. Flexible material 703 includes flanged track guide 704 and PV cells 705. Flanged track guide 704 fits into track 702 and prevents flexible material 703 from disengaging with, and falling off of, slat 701.

Figure 8:
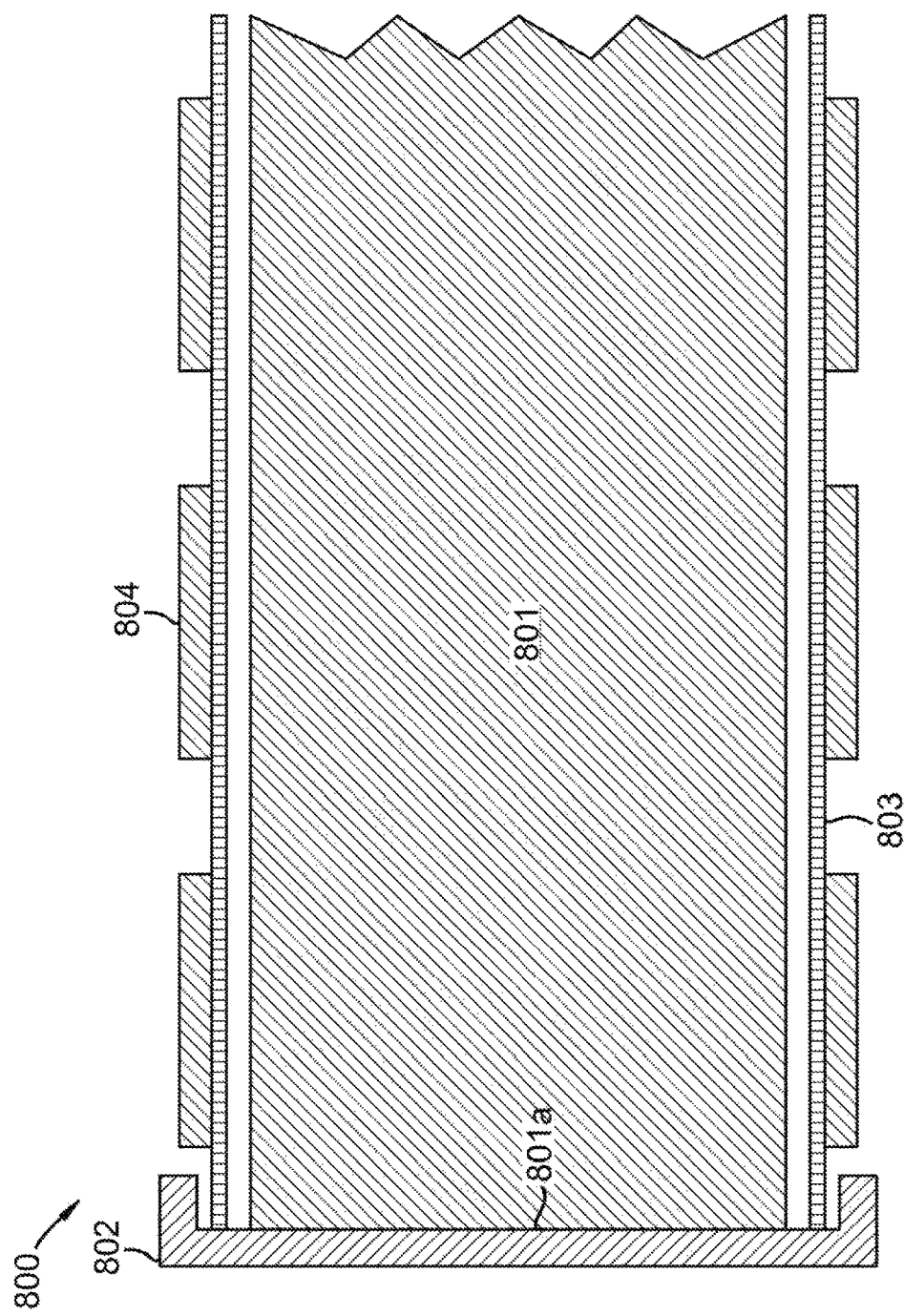
FIG. 8 depicts an embodiment of sliding tracks around a slat for a solar-powered window covering system.

FIG. 8 depicts another embodiment of sliding tracks in a slat for a solar-powered window covering system. Slat 801 includes track 802 positioned at outside edge 801*a*, around slat 801. Flexible material 803 fits into track 802 between slat 801 and track 802.

Figure 9:
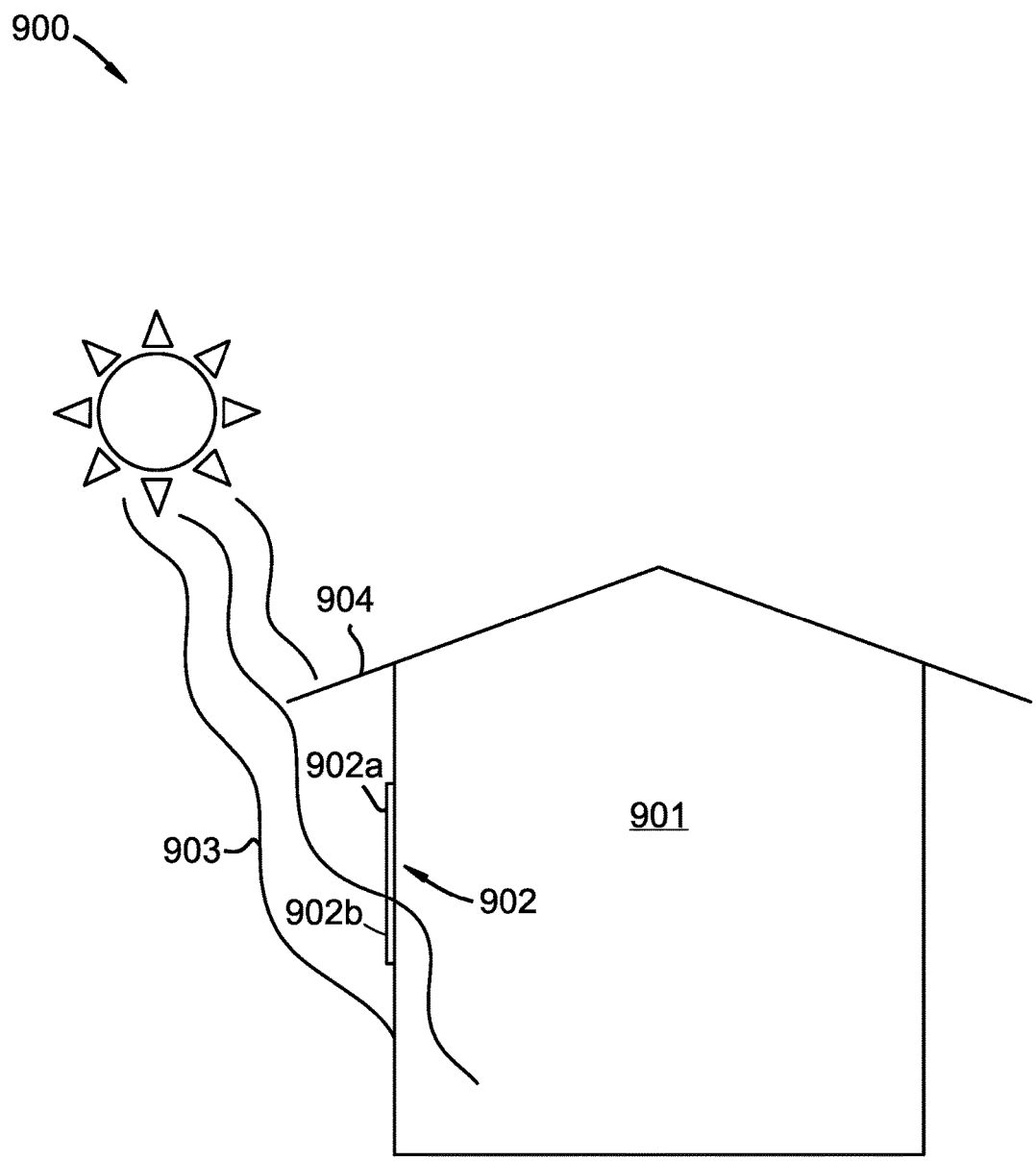
FIG. 9 depicts an example embodiment of a structure in which a solar-powered window covering according to the claimed invention is beneficial.

FIG. 9 depicts an example embodiment of a structure where a solar-powered window covering according to the claimed invention is beneficial. Structure 901 includes window 902. Sunlight 903 is partially obstructed by awning 904 if structure 901. Thus, portion 902*a* of window 902 does not receive sunlight for some of the day, whereas portion 902*b* receives sunlight throughout the entire day. In such embodiments, it is beneficial to position a slat having sliding tracks and PV cells (similar to those described above with regard to FIGS. 1-2 and 6A-8) positioned in a window covering associated with window 902 to maximize an amount of time the slat is exposed to sunlight 904 relative to the entire window covering. Thus, in the depicted embodiment, it is beneficial to position the slat in portion 902*b* of window 902.

Figure 10:
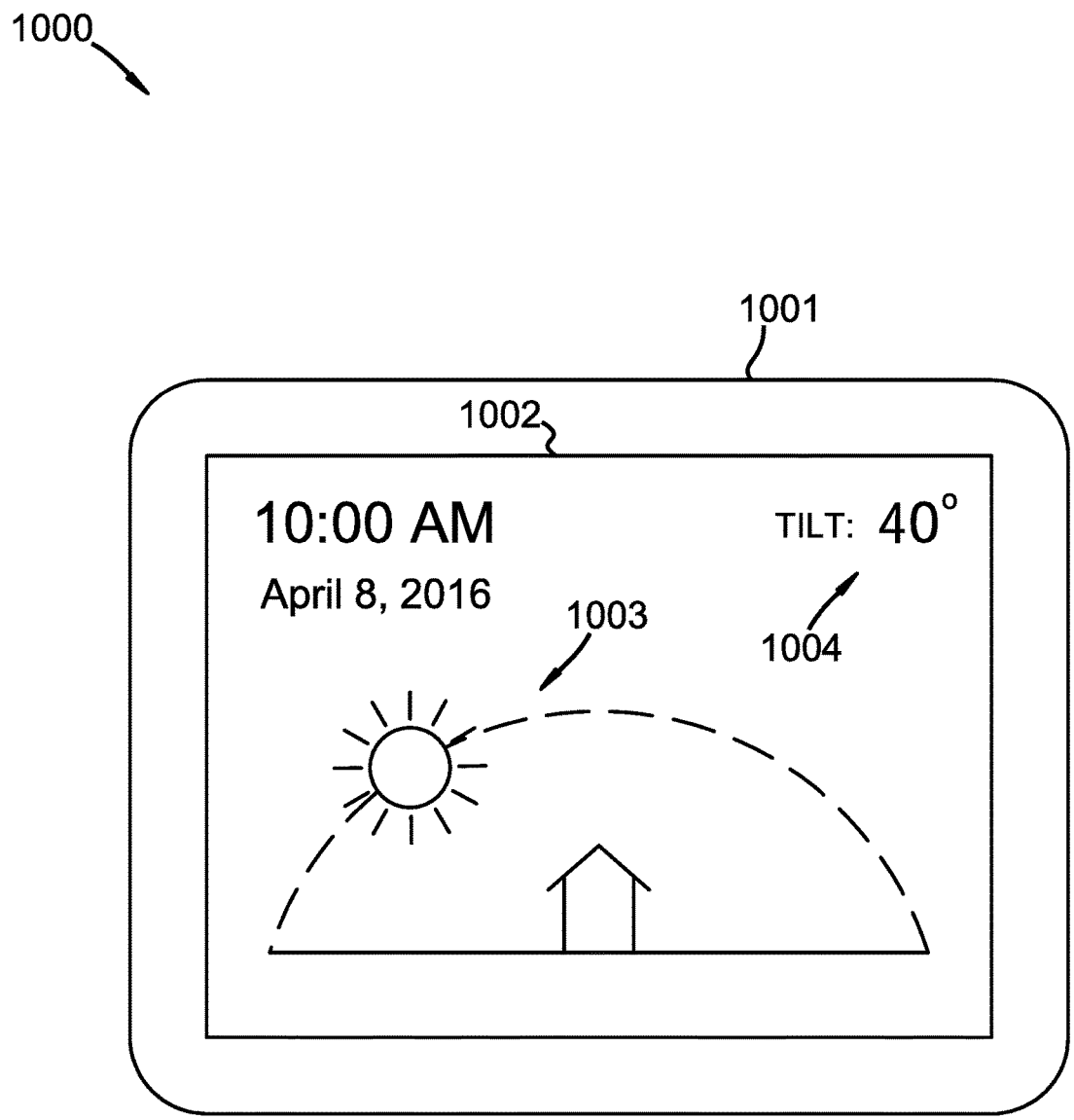
FIG. 10 depicts a digital display and user interface used with some embodiments of the claimed invention.

FIG. 10 depicts a digital display and user interface used with some embodiments of the claimed invention. Control unit 1000 includes case 1001 and user interface 1002. User interface 1002 indicates, tilt 1004 of an associated window covering, and position 1003 of the sun in the sky. In some embodiments, user interface 1002 receives inputs from a user. Control unit 1000 is, in some embodiments, programmed with position 1003 of the sun in the sky based on a date and time, and is further programmed with corresponding ideal tilts 1004 for respective positions 1003 of the sun in the sky. In one embodiment, tilt 1004 is related to position 1003 by an algorithm including an angle of the sun above the horizon and an orientation of a window covering with respect to the sun.

Figure 11A:
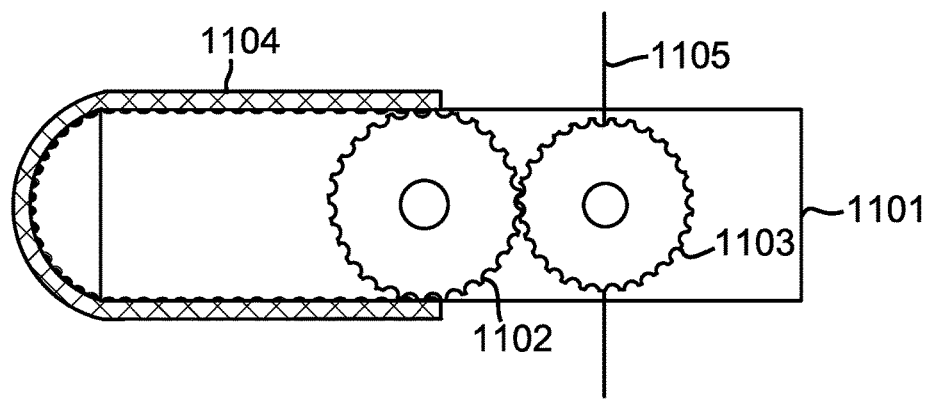
FIGS. 11A-C depict an alternative embodiment of a mechanism that slides PV cells in tracks along a window blind slat, according to the claimed invention.
Figure 11B:
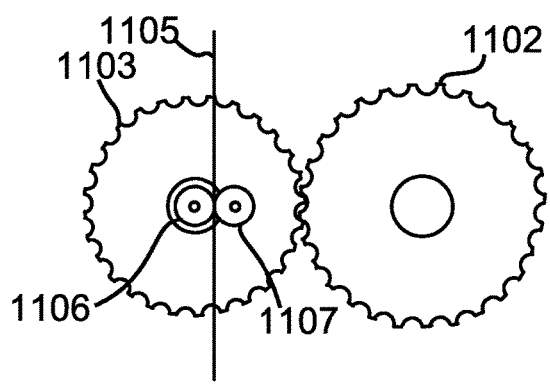
Figure 11C:
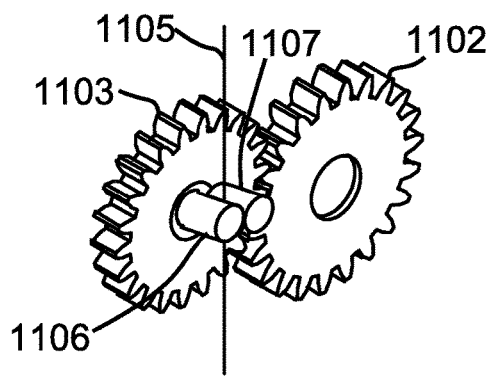

FIGS. 11A-C depict an alternative embodiment of a mechanism that slides PV cells in tracks along a window blind slat, according to the claimed invention. As depicted in FIG. 11A, slat 1101 includes gears 1102, 1103 embedded in slat 1101. Gear 1102 engages PV cells 1104, and gear 1103 engages gear 1102 and string 1105. String 1105 passes through slat 1101 and engages gear 1103. Motion of gear 1103 across string 1105 as slat 1101 is tilted rotates gear 1103, in turn rotating gear 1105 and sliding PV cells 1102 in tracks on slat 1101 across slat 1101.

As depicted in FIGS. 11B-C, string 1105 engages gear 1103 by friction rollers 1106, 1107. String 1105 passes between rollers 1106, 1107, in contact with each, such that motion of rollers 1106, 1107 across string 1105 causes rollers 1106, 1107 to rotate. Roller 1106 is coupled to gear 1103, either directly or indirectly through a gear ratio reducer, which reduces the number of rotations of roller 1106 per rotation of gear 1103.

Figure 12:
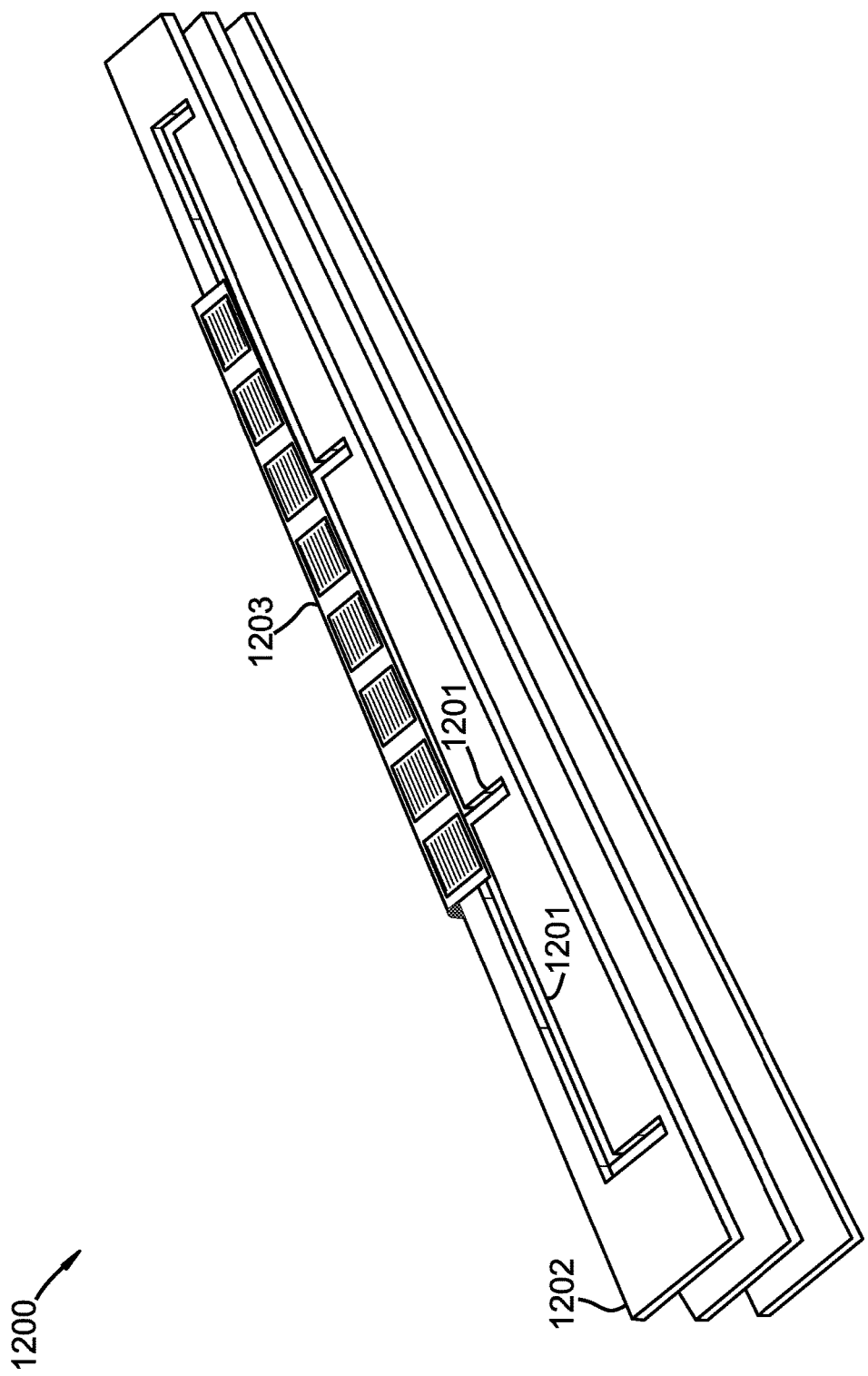
FIG. 12 depicts one alternative embodiment of tracks in a window covering slat.

FIG. 12 depicts one alternative embodiment of tracks in a window covering slat. As depicted, in some embodiments, tracks 1201 run along both a length and width of slat 1202. In such embodiments, PV cells 1203 slide in tracks 1202 along two dimensions of slat 1202.

Figure 13:
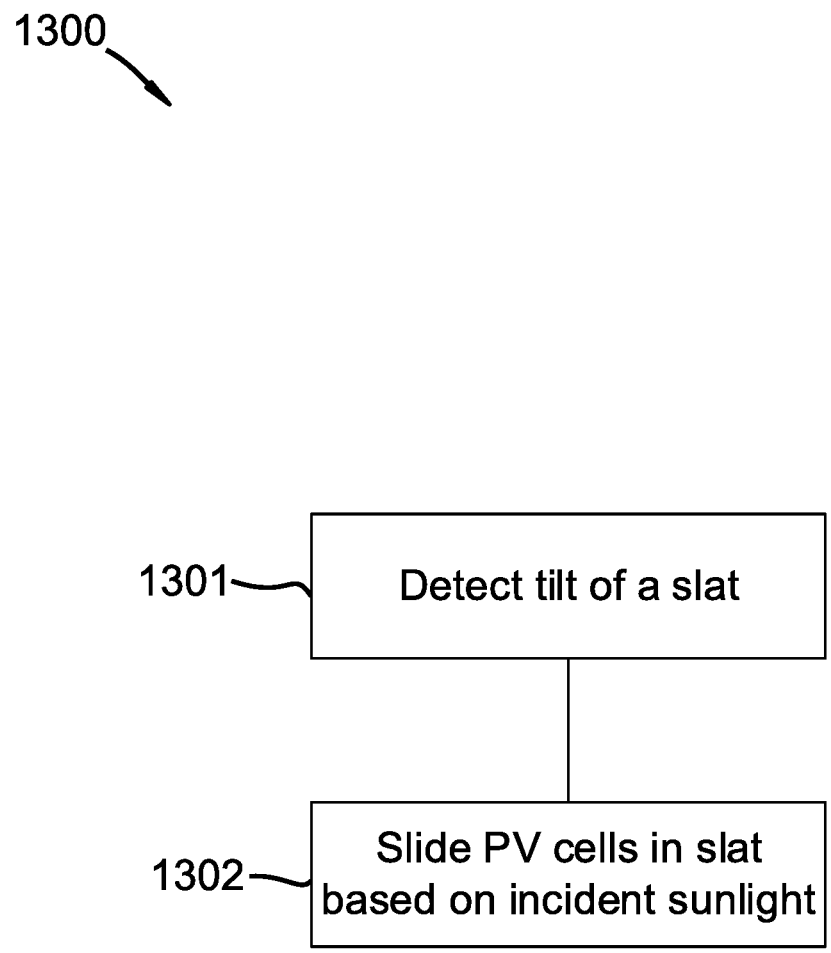
FIG. 13 depicts an example embodiment of a method for operating a solar powered window covering according to the claimed invention.

FIG. 13 depicts an example embodiment of a method for operating a solar powered window covering according to the claimed invention. Method 1300 includes, at 1301, detecting a tilt of at least one window covering slate. The slat includes one or more PV cells disposed in sliding tracks in the slate, the and tilt indicates an amount of sunlight incident on the PV cells. At block 1302, the PV cells are slid in the tracks with regard to the amount of sunlight incident on the cells, maximizing the amount of incident sunlight. In some embodiments Method 1300 also includes adjusting the tilt of the slats to maximize the amount of incident sunlight. In some embodiments, detecting the tilt includes detecting a position of one or more strings that tilt the slat, such as using a potentiometer (similar to that described with regard to FIG. 3). Method 1300 is accomplished in any of a variety of ways using any of a variety of components. For example, in some embodiments, Method 1300 is accomplished using the components described above with regard to FIGS. 1-8 and 11A-D.

Figure 14:
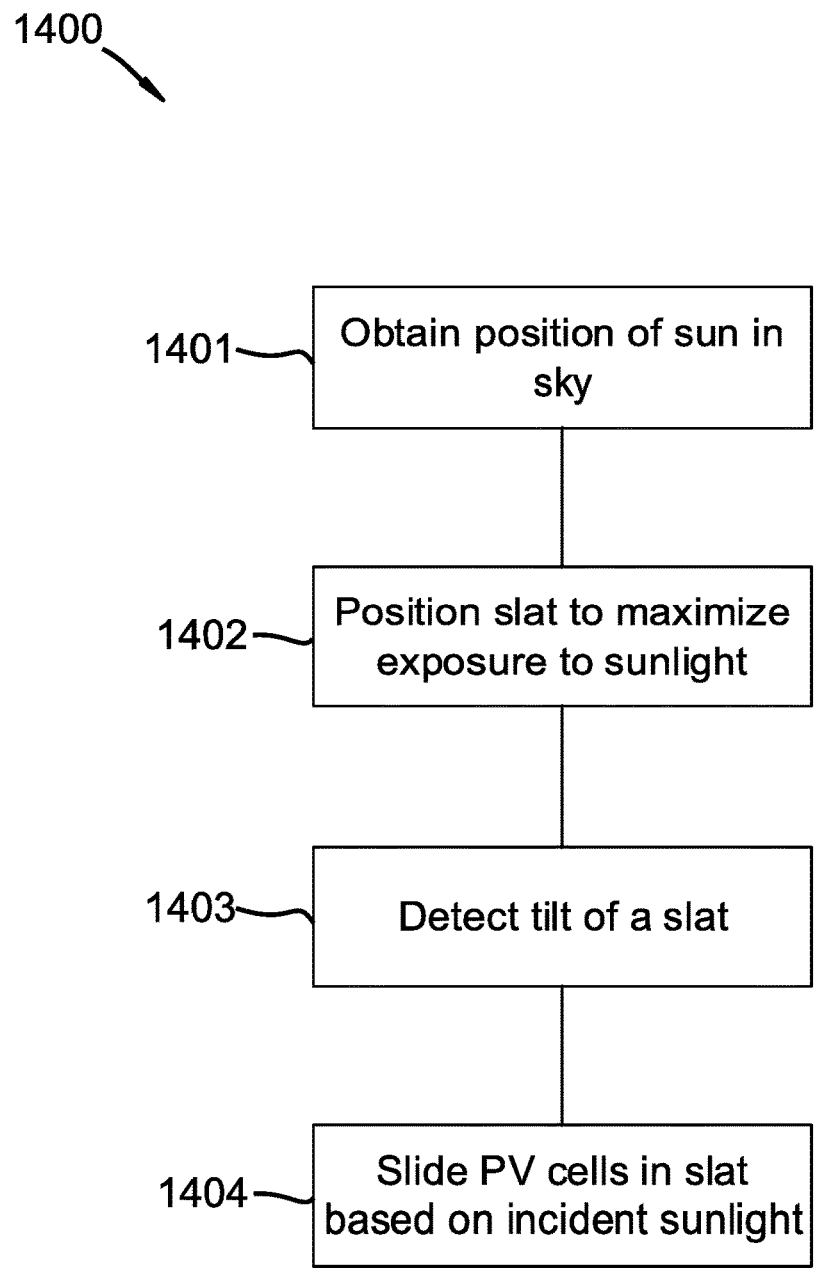
FIG. 14 depicts another example method for operating a solar powered window covering according to the claimed invention.

FIG. 14 depicts another example method for operating a solar powered window covering according to the claimed invention. Method 1400 includes, at block 1401, obtaining a position of the sun in the sky. At block 1402, a slat is positioned in the window covering to maximize an amount of time the slat is exposed to sunlight relative to the entire window covering. At block 1403, a tilt of the slat is detected. The slat includes one or more PV cells. At block 1404, the PV cells are slid in the tracks with regard to the amount of sunlight incident on the cells, maximizing the amount of incident sunlight. Sliding the PV cells is also based on the position of the sun in the sky. Similar to method 1300, method 1400 is accomplished in any of a variety of ways using any of a variety of components, such as those described with regard to FIGS. 1-8 and 10-11D.

Figure 15:
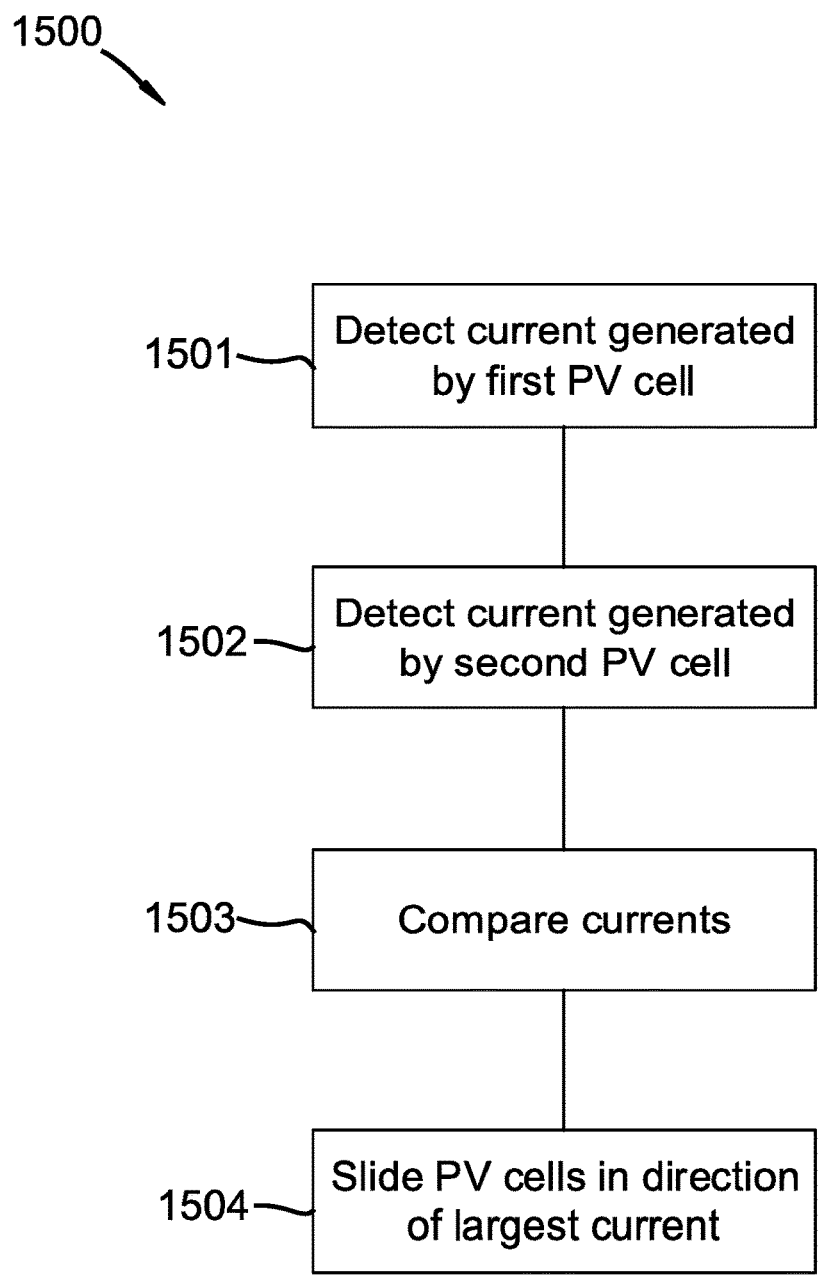
FIG. 15 depicts yet another example method for operating a solar powered window covering according to the claimed invention.

FIG. 15 depicts yet another example method for operating a solar powered window covering according to the claimed invention. Method 1500 includes, at block 1501, detecting an amount of electrical current generated by a first PV cell disposed in sliding tracks in a window covering slat. At block 1502, an amount of electrical current generated by a second PV cell disposed in the sliding tracks is detected. At block 1503, the amounts of current are compared. At block 1504, the PV cells are slid in the tracks in a direction associated with the cell with the largest current.

Method 1500 is accomplished, for example, by calculations performed by a processor. The processor associates the PV cells with an orientation relative to each other cell and relative to the slat. The processor calculates which PV cells are generating the most current, and slide the entire set of PV cells along the current gradient in the direction of increasing current. A previously measured current for all the PV cells is compared to a new current for the new position of the PV cells. The PV cells are continuously slid in the same direction until the new current is less than the previous current. In some embodiments, comparing the amounts of current comparing the amounts of current to a minimum threshold. The PV cells are slid in the direction when at least one of the currents is above the minimum threshold. In other embodiments, a minimum current difference must be met before the PV cells are repositioned.

Figure 16:
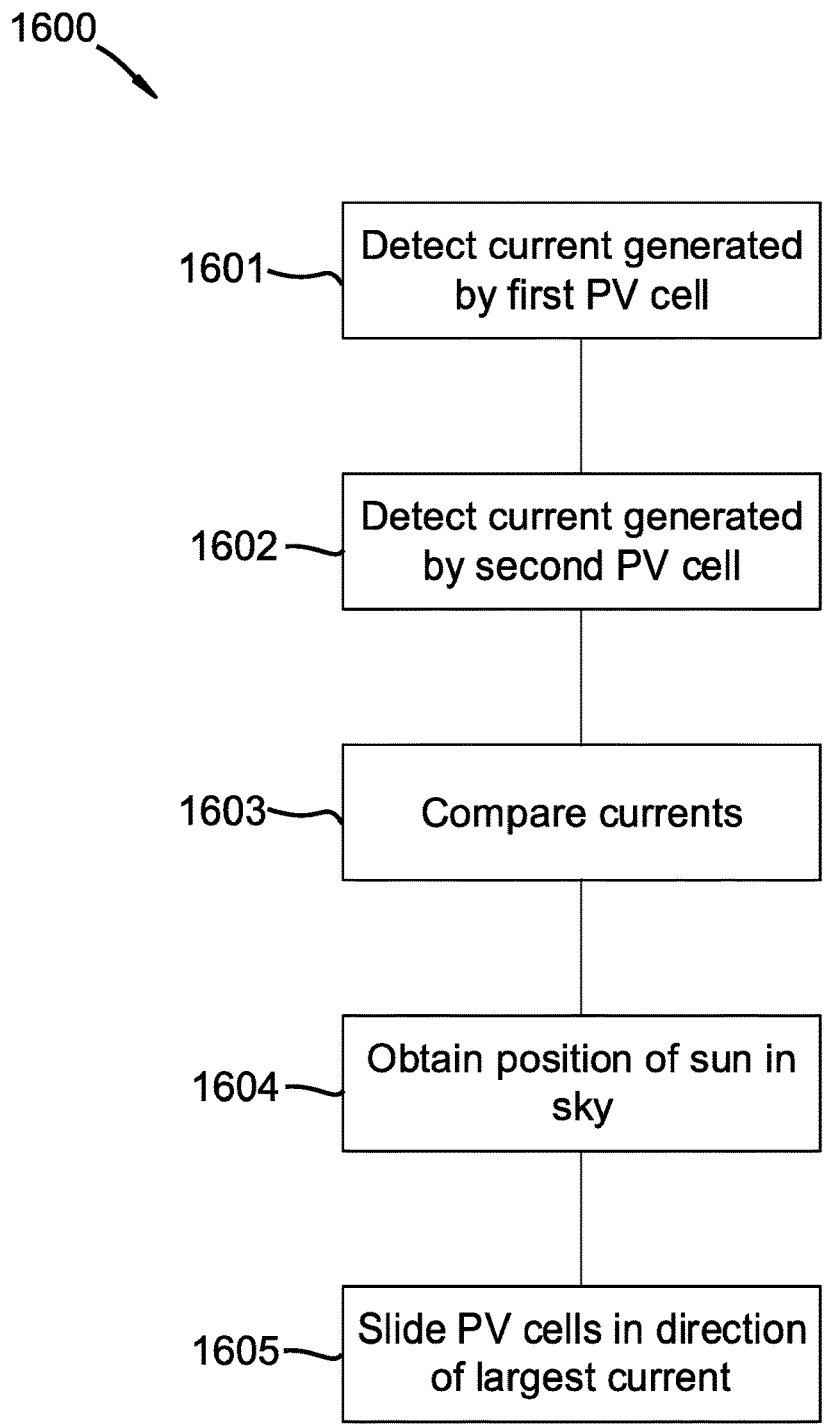
FIG. 16 depicts another embodiment of a method for operating a solar powered window covering according to the claimed invention.

FIG. 16 depicts another embodiment of a method for operating a solar powered window covering according to the claimed invention. Method 1600 includes, at block 1601, detecting an amount of electrical current generated by a first PV cell disposed in sliding tracks in a window covering slat. At block 1602, an amount of electrical current generated by a second PV cell disposed in the sliding tracks is detected. At block 1603, the amounts of current are compared. At block 1604, a position of the sin in the sky is obtained. At block 1504, the PV cells are slid in the tracks in a direction associated with the cell with the largest current. The sliding is additionally based on the position of the sin in the sky.

Figure 17:
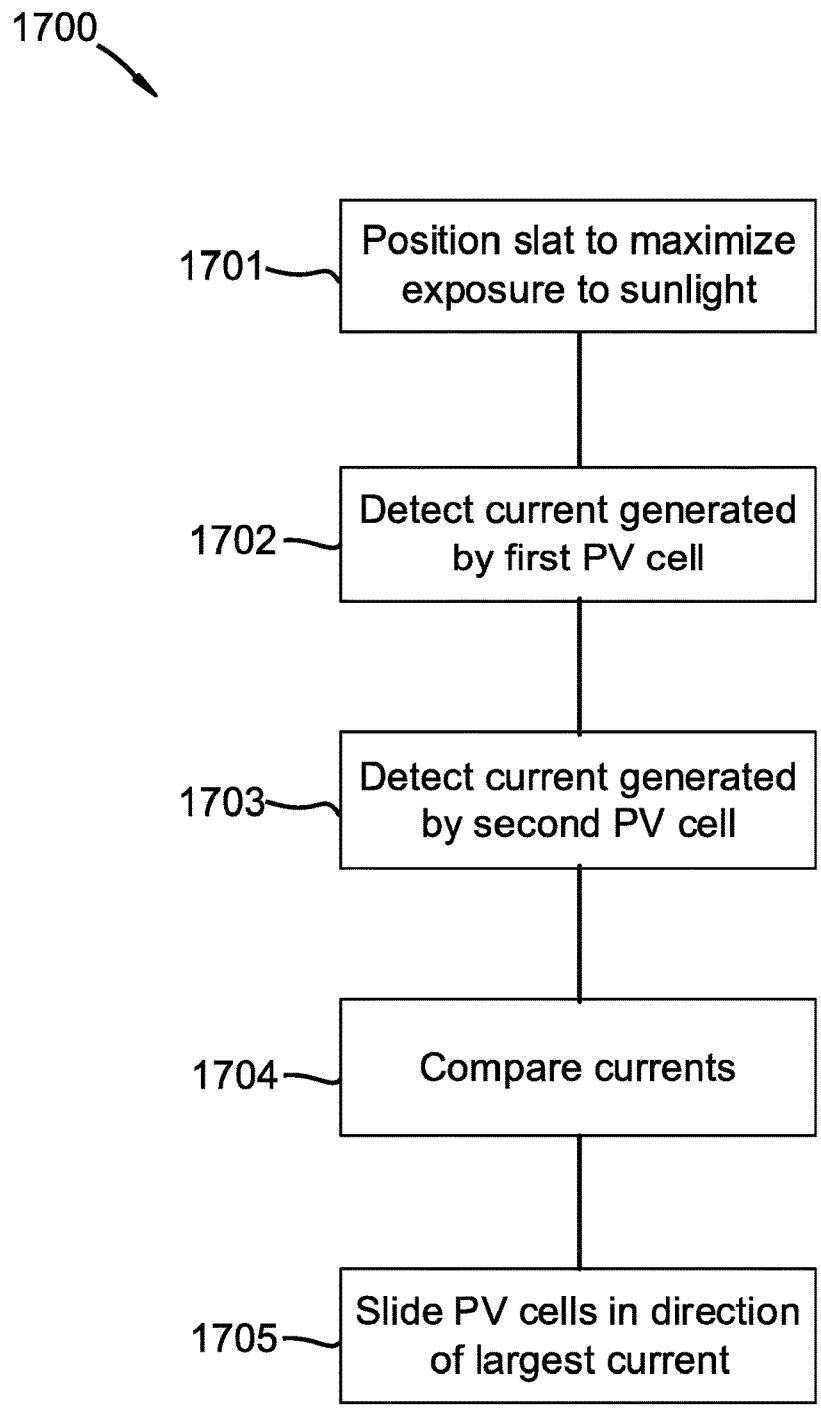
FIG. 17 depicts one more embodiment of a method for operating a solar powered window covering according to the claimed invention.

FIG. 17 depicts one more embodiment of a method for operating a solar powered window covering according to the claimed invention. At block 1701, a slat is positioned in a window covering to maximize an amount tome the slat is exposed to sunlight relative to the entire window covering. At block 1702, an amount of electrical current generated by a first PV cell disposed in sliding tracks in the window covering slat is detected. At block 1703, an amount of electrical current generated by a second PV cell disposed in the sliding tracks is detected. At block 15704, the amounts of current are compared. At block 1705, the PV cells are slid in the tracks in a direction associated with the cell with the largest current.

The invention claimed is:

1. A solar powered window covering system comprising:
a headrail comprising a motor and gearbox;
one or more tiltable slats, wherein at least one slat of the one or more tiltable slats comprises sliding tracks;
one or more flexible photovoltaic (PV) cells movably disposed within the sliding tracks enabling the one or more PV cells to slide across and around the at least one slat, to a top side or a bottom side of the at least one slat; and
a microcontroller controlling the motor, gearbox, tiltable slats, and the one or more PV cells in the sliding tracks; wherein the one or more tiltable slats are adjusted to adjust an amount of light entering into a room and the microcontroller causes the one or more PV cells to slide in the sliding tracks to reposition the one or more PV cells to maximize an amount of sunlight incident on the one or more PV cells.

2. The system of claim 1, further comprising a MEMS inclinometer coupled to the one or more slats, wherein the inclinometer increases the amount of sunlight incident on the one or more PV cells by detecting a tilt of the one or more slats communicating the angle of tilt to the microcontroller; the microcontroller instructing the one or more PV cells to slide within the sliding track such that the one or more PV cells are positioned to receive more sunlight.

3. The system of claim 1, further comprising a potentiometer coupled to strings that tilt the slats, wherein the potentiometer indicates the amount of sunlight incident on the one or more PV cells by detecting a position of the strings.

4. The system of claim 1, further comprising a microcontroller having instructions to instruct the motor to tilt the tiltable slats to maximize a current generated by the one or more PV cells.

5. The system of claim 1, further comprising a rigid coupling member coupled to the one or more PV cells and an outside edge of a tiltable slat above the cell, wherein the coupling member forces the one or more cells to slide in the sliding tracks when the tilt of the one or more tiltable slats is adjusted.

6. The system of claim 1, further comprising a motor and one or more gears embedded into the one or more tiltable slats, wherein the embedded motor and gears force the one or more PV cells to slide in the sliding tracks when the tilt of the one or more tiltable slats is adjusted.

7. The system of claim 6, wherein the one or more PV cells are mounted to a flexible material, and wherein the flexible material is perforated to fit over the gears.

8. The system of claim 6, wherein the one or more PV cells are mounted to a flexible material, wherein the one or more gears are positioned in the sliding track, and wherein the flexible material includes teeth protruding into the sliding track that engage the one or more gears.

9. The system of claim 1, wherein the window covering system has an open position and a closed position, in the closed position the microcontroller causes the one or more PV cells to slide in the sliding tracks and be repositioned to maximize an amount of time the one or more PV cells are exposed to the sunlight.

10. The system of claim 1, further comprising a control device indicating a position of the sun in the sky.

11. The system of claim 1, further comprising a string passing through the one or more slats that engages one or more gears embedded in the one or more slats, wherein the gears engage the one or more PV cells and, when rotated, slide the one or more PV cells in the sliding tracks, wherein motion of the gears across the string as the tiltable slats are tilted slides the one or more PV cells in the sliding tracks.

12. A method of operating a solar powered window covering system, comprising:
    detecting a tilt of at least one tiltable window covering slat, wherein the slat comprises one or more photovoltaic (PV) cells disposed in sliding tracks in the tiltable slat, and wherein the tilt indicates an amount of sunlight incident on the one or more PV cells; and
    sliding the one or more PV cells in the sliding tracks to reposition the one or more PV cells to maximize to the amount of sunlight incident on the one or more PV cells.

13. The method of claim 12, wherein detecting the tilt of the at least one tiltable slat further comprises detecting a position of one or more strings that tilt the tiltable slat.

14. The method of claim 12, wherein the at least one tiltable slat further comprises an inclinometer that detects the tilt of the slat.

15. The method of claim 12, further comprising obtaining a position of the sun in the sky, wherein the sliding of the one or more PV cells is additionally based on the position of the sun in the sky.

16. The method of claim 12, further comprising positioning the tiltable slat in the window covering to maximize an amount of time the at least one tiltable slat is exposed to sunlight relative to the entire window covering.

17. A method of operating a solar powered window covering system, comprising:
    detecting an amount of electrical current generated by a first photovoltaic (PV) cell disposed in sliding tracks in a tiltable window covering slat;
    detecting an amount of electrical current generated by a second PV cell disposed in the sliding tracks in the tiltable window covering slat;
    comparing the amounts of current; and
    sliding the PV cells in the sliding tracks in a direction associated with the PV cell with the largest current.

18. The method of claim 17, further comprising obtaining a position of the sun in the sky, wherein the sliding of the first or second PV cell is additionally based on the position of the sun in the sky.

19. The method of claim 17, wherein comparing the amounts of current comprises comparing the amounts of current to a minimum threshold, and wherein the first PV cell or the second PV cell are slid in the direction associated with the PV cell having the highest current above the minimum threshold.

20. The method of claim 17, further comprising positioning the tiltable slat in the window covering to maximize an amount of time the first PV cell or the second PV cell is exposed to sunlight relative to the entire window covering system.

* * * * *